US012675428B2

(12) United States Patent
Lu et al.

(10) Patent No.: US 12,675,428 B2
(45) Date of Patent: Jul. 7, 2026

(54) COMMUNICATION APPARATUS AND DATA TRANSMISSION METHOD

(71) Applicant: HUAWEI TECHNOLOGIES CO., LTD., Shenzhen (CN)

(72) Inventors: Deng Lu, Shenzhen (CN); Ke Zheng, Shenzhen (CN); Zhenxing Zhang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 390 days.

(21) Appl. No.: 18/361,674

(22) Filed: Jul. 28, 2023

(65) Prior Publication Data

US 2024/0004826 A1     Jan. 4, 2024

Related U.S. Application Data

(63) Continuation of application No. PCT/CN2021/074561, filed on Jan. 30, 2021.

(51) Int. Cl.
*G06F 13/42* (2006.01)

(52) U.S. Cl.
CPC .. *G06F 13/4282* (2013.01); *G06F 2213/0042* (2013.01)

(58) Field of Classification Search
None
See application file for complete search history.

(56) References Cited

U.S. PATENT DOCUMENTS

| | | | |
|---|---|---|---|
| 6,483,804 B1 * | 11/2002 | Muller | H04L 49/9063 |
| | | | 709/228 |
| 10,609,741 B2 | 3/2020 | Babbage, II et al. | |
| 2005/0036520 A1 * | 2/2005 | Zeng | H04J 3/1617 |
| | | | 370/535 |

(Continued)

FOREIGN PATENT DOCUMENTS

| | | |
|---|---|---|
| CN | 104205781 A | 12/2014 |
| EP | 2862290 B1 | 4/2015 |
| WO | 2014185944 A1 | 11/2014 |

OTHER PUBLICATIONS

DiiVa, "DiiIVA Specification 1.1 Release Candidate," Oct. 5, 2010, 312 pages.

(Continued)

*Primary Examiner* — Henry Tsai
*Assistant Examiner* — Dean Phan
(74) *Attorney, Agent, or Firm* — Fish & Richardson P.C.

(57) ABSTRACT

The present disclosure relates to a communication apparatus and a data transmission method. In an example, the communication apparatus includes a universal serial bus (USB) protocol layer, a USB adapter layer, a transport layer, and a physical layer. The USB protocol layer is configured to send first data to the USB adapter layer. The USB adapter layer is configured to perform physical link adaptation on the first data to obtain second data and send the second data to the transport layer. The first data is adapted to a first physical link, the second data is adapted to a second physical link, and a bandwidth of the first physical link is lower than a bandwidth of the second physical link. The transport layer and the physical layer are configured to process the second data and send processed second data to a receive end through the second physical link.

20 Claims, 14 Drawing Sheets

(56)                    References Cited

U.S. PATENT DOCUMENTS

2010/0275037  A1*  10/2010  Lee ....................... G06F 13/385
                                                         713/323
2011/0208892  A1*   8/2011  Meyers ................. G06F 13/385
                                                         710/313
2016/0380890  A1*  12/2016  Hennig ................... H04L 69/18
                                                         370/390
2019/0004987  A1*   1/2019  Henson .............. G06F 13/4022

OTHER PUBLICATIONS

USB 3.0 Promoter Group, "Universal Serial Bus 4 (USB4™) Specification," Jun. 2020, 576 pages.
International Search Report and Written Opinion in International Appln. No. PCT/CN2021/074561, mailed on Nov. 3, 2021, 17 pages (with English translation).
Extended European Search Report in European Appln No. 21921921.9, dated Nov. 22, 2023, 10 pages.

* cited by examiner

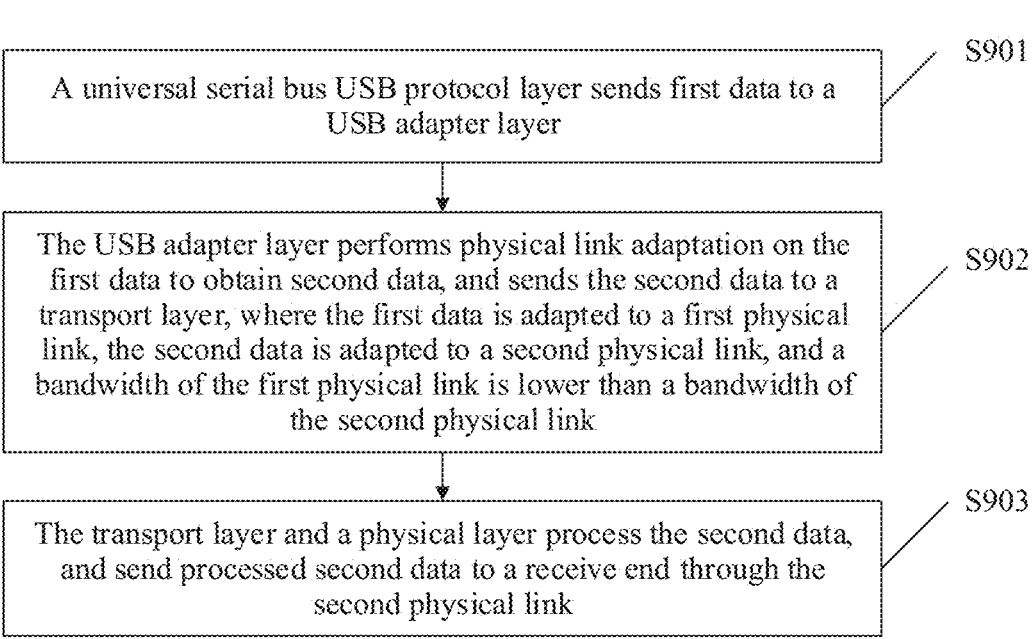

900

A universal serial bus USB protocol layer sends first data to a USB adapter layer

S901

The USB adapter layer performs physical link adaptation on the first data to obtain second data, and sends the second data to a transport layer, where the first data is adapted to a first physical link, the second data is adapted to a second physical link, and a bandwidth of the first physical link is lower than a bandwidth of the second physical link

S902

The transport layer and a physical layer process the second data, and send processed second data to a receive end through the second physical link

COMMUNICATION APPARATUS AND DATA TRANSMISSION METHOD

CROSS-REFERENCE TO RELATED APPLICATIONS

This application is a continuation of International Application No. PCT/CN2021/074561, filed on Jan. 30, 2021, the disclosure of which is hereby incorporated by reference in its entirety.

TECHNICAL FIELD

This application relates to the field of communication technologies, and in particular, to a communication apparatus and a data transmission method.

BACKGROUND

Video and data transmission interfaces have high requirements on transmission bandwidths. However, due to limitations of chip manufacturing techniques and transmission lines, it is difficult to simply increase a transmission rate of a serializer/deserializer (serializer/deserializer, SerDes). To increase the bandwidth, a common practice is to increase a quantity of SerDes physical links, but this increases sizes of connectors and cables to some extent and deteriorate user experience. On the premise that sizes of connectors and cables are limited, in order to provide a higher total bandwidth, appropriate methods should be used to increase a transmission rate of a low-speed SerDes physical link.

A universal serial bus (universal serial bus, USB) has been widely used in the consumer field since being launched, and has become one of standard expansion interfaces and necessary interfaces for a large quantity of computers and intelligent devices in the 21st century. In 2019, the USB Implementers Forum (USB implementers forum, USB-IF) released a USB 4.0 protocol. The protocol is backward compatible with USB 2.0 and USB 3 generation 1 (USB 3 Generation 1) protocols, and further supports a USB 3 generation 2 (USB 3 Generation 2) protocol, a display port (Display Port, DP) protocol, and a peripheral component interconnect express (Peripheral Component Interconnect Express, PCIe) protocol through a tunneling protocol. A transmission rate of a single serializer/deserializer link may be 10 Gbps or 20 Gbps. However, in the backward-compatible USB 2.0 protocol, a dedicated physical link is used for data transmission, and a transmission rate is up to 480 Mbps. Consequently, bandwidth utilization is seriously insufficient.

In the conventional technology, to increase a bandwidth of a SerDes physical link, an electrical signal of a USB 2.0 bus is converted into a signal appropriate for transmission on a common high-speed physical link, and then the signal is transmitted on the common high-speed physical link. An excess bandwidth of the common high-speed physical link may be used to transmit other data, thereby increasing a total bandwidth.

However, in the conventional technology, when an electrical signal of a USB 2.0 pin is converted into a signal that can be transmitted on another common high-speed physical link, a USB 2.0 physical layer is added on a USB 2.0 data transmission path between a local side and a peer end. This greatly increases a transmission delay of USB 2.0 data, and it is difficult to meet a requirement of the USB 2.0 protocol and difficult to apply.

SUMMARY

Embodiments of this application disclose a communication apparatus and a data transmission method, to effectively reduce a data transmission delay while pin bandwidth utilization of the communication apparatus is increased. In addition, data transmission is not limited by a transmission form of a physical link. Further, compared with the conventional technology, this application can reduce a chip area and hardware costs.

According to a first aspect, an embodiment of this application discloses a communication apparatus, including a universal serial bus USB protocol layer, a USB adapter layer, a transport layer, and a physical layer. The USB protocol layer is configured to send first data to the USB adapter layer. The USB adapter layer is configured to perform physical link adaptation on the first data to obtain second data, and send the second data to the transport layer. The first data is adapted to a first physical link, the second data is adapted to a second physical link, and a bandwidth of the first physical link is lower than a bandwidth of the second physical link. The transport layer and the physical layer are configured to process the second data, and send processed second data to a receive end through the second physical link.

It should be understood that a protocol of the second physical link may be an existing protocol or a set of data exchange communication methods set by a person skilled in the art. A protocol of the first physical link may be a USB 2.0 protocol, and the protocol complies with a USB transceiver macrocell interface (USB transceiver macrocell interface, UTMI) protocol or a UTMI low pin interface (UTMI Low Pin Interface, ULPI) protocol.

It can be learned that in this embodiment of this application, when the foregoing communication apparatus communicates with the receive end, the USB adapter layer first performs physical link adaptation on the first data, to convert the first data transmitted on the first physical link into the second data transmitted on the second physical link. The second physical link is a high-speed physical link whose bandwidth is higher than that of the first physical link. In this embodiment of this application, the first data (protocol layer data) sent by the USB protocol layer is converted, to obtain the data that can be transmitted on the second physical link, and then the data is transmitted to the receive end through the transport layer, the physical layer, and the second physical link. There is no need to pass through a USB physical layer and a pin that match the USB protocol layer. Therefore, the USB physical layer and the pin do not need to be configured in the foregoing communication apparatus. This can reduce chip areas of the USB physical layer and the pin and increase costs of the USB physical layer and the pin. Further, because data transmission does not need to pass through the USB physical layer, intermediate links of data transmission can be reduced. Therefore, a receiving delay of the receive end can be effectively reduced, to meet a requirement of a low delay of a communication protocol, and application is easy. In addition, when the protocol of the first physical link is the USB 2.0 protocol, a physical form of the first physical link is a wired form. In this embodiment of this application, physical link adaptation is performed on the first data, so that the obtained second data can be transmitted on the high-speed second physical link. The second physical link is not limited by a physical form, in other words, may be in a wired or wireless form. Therefore, the communication apparatus in this embodiment of this application has good adaptability, and may be applicable to different application scenarios. It should be understood that in this embodiment of this application, the transport layer, the physical layer, the USB protocol layer, and the USB adapter layer are integrated in a same communication apparatus. In an optional case, the transport layer and the physical layer may be located in an independent adapter or switch, in other words, the USB protocol layer and the USB adapter layer are in the communication apparatus. The USB protocol layer and the USB adapter layer process data and send processed data to the adapter or switch. The transport layer and the physical layer in the adapter or switch process the data and transmit processed data to a target apparatus through the high-speed physical link. The target apparatus may alternatively be connected to the high-speed physical link through the adapter or switch.

In a feasible implementation, when the first data includes any one of a token packet, a handshake packet, or a special packet, the USB adapter layer is specifically configured to encapsulate the first data according to the protocol of the second physical link to obtain a first transmission packet, where the second data includes the first transmission packet.

It can be learned that in this embodiment of this application, when the first data includes any one of the token packet, the handshake packet, or the special packet, the USB adapter layer directly encapsulates the first data as a data payload to obtain the first transmission packet adapted to the second physical link. In this way, the first transmission packet is subsequently transmitted through the second physical link, and transmission does not need to be performed by using the USB physical layer, the pin, and the first physical link that match the USB protocol layer. Therefore, the receiving delay of the receive end can be effectively reduced, and the chip area and the related costs of the USB physical layer and the pin can be reduced.

In a feasible implementation, when the first data includes a data packet, the USB adapter layer is specifically configured to: split the data packet into a plurality of first data payloads, and separately encapsulate the plurality of first data payloads according to the protocol of the second physical link to obtain a plurality of second transmission packets, where the second data includes the plurality of second transmission packets.

It can be learned that in this embodiment of this application, for the data packet with a large data volume, the USB adapter layer may split the data packet into the plurality of first data payloads, and then separately encapsulate the plurality of first data payloads to obtain the plurality of second transmission packets. Because a data volume of each second transmission packet is small, the receiving delay of the receive end can be effectively reduced, to meet the requirement of the low delay of the communication protocol.

In a feasible implementation, when the first data further includes a bus event, the USB adapter layer is specifically configured to: when the bus event arrives, encapsulate a start part of the bus event according to the protocol of the second physical link to obtain a third transmission packet. The transport layer and the physical layer are specifically configured to process the third transmission packet and send a processed third transmission packet to the receive end through the second physical link. The USB adapter layer is further specifically configured to: when the bus event ends, encapsulate an end part of the bus event according to the protocol of the second physical link to obtain a fourth transmission packet. The transport layer and the physical layer are specifically configured to process the fourth transmission packet and send a processed fourth transmission packet to the receive end through the second physical link.

It can be learned that in this embodiment of this application, in a process in which the communication apparatus encapsulates the bus event, the start part and the end part of the bus event are separately encapsulated, but a middle part of the bus event is not encapsulated, to reduce the receive delay of the receive end, so as to meet the requirement of the low delay of the communication protocol.

In a feasible implementation, the USB protocol layer is further configured to send control information to the USB adapter. The USB adapter layer is further configured to obtain first virtual resistor information from the control information through parsing, and encapsulate the first virtual resistor information to obtain a fifth transmission packet. The transport layer and the physical layer are specifically configured to process the fifth transmission packet and send a processed fifth transmission packet to the receive end through the second physical link. The first virtual resistor information is used to represent a status of a virtual bus by describing an on state or off state of a virtual resistor in the communication apparatus. The virtual bus is a bus that matches the USB protocol layer, and the virtual resistor in the communication apparatus corresponds to a physical resistor. The physical resistor includes at least one of a high-speed termination resistor, a pull-up resistor, or a pull-down resistor.

In a feasible implementation, the first virtual resistor information further includes high impedance (High-Z) information. The high impedance information is used to represent an on state or off state of high impedance, and the high impedance is used to represent a connection status between the communication apparatus and the receive end. When a communication connection is established between the communication apparatus and the receive end, the high impedance is in the off state. When no communication connection is established between the communication apparatus and the receive end, the high impedance is in the on state.

It can be learned that in the conventional technology, USB protocol layer data is transmitted by using a USB physical layer and a pin. However, in this embodiment of this application, after the USB adapter layer performs physical link adaptation on USB protocol layer data, the USB physical layer and the pin do not need to be configured in the communication apparatus. That is, there is no physical resistor in the USB physical layer at this time. However, the USB protocol layer needs to obtain information about the resistor in the USB physical layer to report the bus status. In this embodiment of this application, the virtual resistor corresponding to a physical resistor in the USB physical layer is introduced, and the virtual resistor information is used to represent the status of the virtual bus. In this way, a bus status reporting requirement of the USB protocol layer is met, so that improvement of the communication apparatus in this embodiment of this application compared with the conventional technology is invisible or transparent to the USB protocol layer. To be specific, data received and sent by the USB protocol layer in the conventional technology corresponds to data received and sent by the USB protocol layer in this embodiment of this application, to meet a communication requirement of the USB protocol layer. It should be understood that the first virtual resistor is obtained from the control information sent by the USB protocol layer to the USB adapter layer, the second virtual resistor information is obtained from a sixth transmission packet, and the first virtual resistor information and the second virtual resistor information are locally stored and updated or maintained. A local storage unit of the first virtual resistor information and the second virtual resistor information is not limited to a register.

In a feasible implementation, the first transmission packet, the second transmission packet, the third transmission packet, the fourth transmission packet, and the fifth transmission packet each include a header and a data payload, and the header includes corresponding transmission packet type information, data payload length information, and reliability protection information.

It can be learned that in this embodiment of this application, the USB adapter layer may encapsulate first data including different content into transmission packets of a same format, so that formats of corresponding transmission packets obtained after physical link adaptation is performed on the different types of first data are the same. This facilitates subsequent transmission on the common second physical link, to implement a function of communication between the communication apparatus and the receive end.

In a feasible implementation, the physical layer and the transport layer are further configured to process third data received through the second physical link, and send processed third data to the USB adapter layer. The USB adapter layer is further configured to perform physical link adaptation on the processed third data to obtain fourth data, and send the fourth data to the USB protocol layer. The third data is adapted to the second physical link and the fourth data is adapted to the first physical link.

It can be learned that in this embodiment of this application, the USB adapter layer in the communication apparatus may further perform physical link adaptation on the processed third data to obtain the fourth data, in other words, re-assemble the processed third data to obtain the fourth data. With reference to the foregoing embodiments, it can be learned that the communication apparatus in this application may not only send the data to the receive end, but also re-assemble the data sent by the receive end and send the re-assembled data to the USB protocol layer, thereby implementing a function of performing bidirectional data transmission between the communication apparatus and the receive end.

In a feasible implementation, when the processed third data includes one or more transmission packets, the USB adapter layer is specifically configured to: separately parse a header or headers of the one or more transmission packets to obtain type information of the one or more transmission packets; and when the one or more transmission packets are data packets, aggregate one or more data payloads corresponding to the one or more transmission packets to obtain the fourth data; or when the one or more transmission packets are not data packets, use each of one or more data payloads corresponding to the one or more transmission packets as the fourth data.

It can be learned that in this embodiment of this application, the USB adapter layer may correspondingly re-assemble the plurality of received transmission packets. Specifically, for the first data that is encapsulated separately as a data payload during encapsulation, the data payload of the first data serves as the fourth data. For the first data that is split into the plurality of data payloads during encapsulation, the plurality of split data payloads may be aggregated, and aggregated data serves as the fourth data. According to the foregoing re-assembly process, a re-assembly process of the third data may correspond to an encapsulation process of the first data, to implement normal communication between the communication apparatus and the receive end.

In a feasible implementation, the physical layer and the transport layer are further configured to process the sixth transmission packet received through the second physical link, and send a processed sixth transmission packet to the USB adapter layer. The USB adapter layer is further configured to receive the processed sixth transmission packet, and parse the processed sixth transmission packet to obtain the second virtual resistor information. The second virtual resistor information includes an on state or off state of a virtual resistor at the receive end. The second virtual resistor information is used to represent a status of a virtual bus, and the virtual resistor at the receive end corresponds to a physical resistor. The physical resistor includes at least one of a high-speed termination resistor, a pull-up resistor, or a pull-down resistor.

It can be learned that in this embodiment of this application, the communication apparatus may further receive the sixth transmission packet including the second virtual resistor information, and obtain the second virtual resistor information by parsing the sixth transmission packet. In this embodiment of this application, the second virtual resistor information is received instead of directly detecting an on state or off state of the physical resistor on the bus, and then the virtual resistor information is used to represent the status of the virtual bus, to meet the bus status reporting requirement of the USB protocol layer.

In a feasible implementation, the USB adapter layer is further configured to: when the USB adapter layer receives the first data, determine the status of the virtual bus based on content of the first data; when the USB adapter layer sends the fourth data, determine the status of the virtual bus based on content of the fourth data; or when the USB adapter layer neither receives the first data and nor sends the fourth data, determine the status of the virtual bus based on the first virtual resistor information and the second virtual resistor information; and send the current status of the virtual bus to the USB protocol layer.

It can be learned that in this embodiment of this application, in different data transmission scenarios, the status of the virtual bus may be determined according to different rules, to meet a requirement of the USB protocol layer for receiving status information of the virtual bus. The USB physical layer and the pin may be removed in this embodiment of this application, there is no physical resistor and no USB 2.0 bus. Therefore, the virtual resistor is introduced to represent the physical resistor in the USB physical layer, and the virtual bus is introduced to represent the USB 2.0 bus. When the USB adapter layer neither receives the first data and nor sends the fourth data, the USB adapter layer may determine the status of the virtual bus based on the first virtual resistor information sent to the receive end and the second virtual resistor information received from the receive end, and send the status of the virtual bus to the USB protocol layer. In this way, the bus status reporting requirement of the USB protocol layer is met.

In a feasible implementation, the USB adapter layer is further configured to determine a working status of the communication apparatus at a next moment based on the status of the virtual bus. The working status includes at least one of the following: whether the USB protocol layer sends the first data or whether the USB protocol layer receives sixth data, the content included in the first data when the USB protocol layer sends the first data, or the first virtual resistor information obtained, by the USB adapter layer by parsing the control information, when the USB protocol layer sends the control information.

It can be learned that in this embodiment of this application, the USB protocol layer may determine, based on the received status of the virtual bus, the control information sent by the USB protocol layer to the USB adapter layer, and the USB adapter layer determines the working status of the communication apparatus at the next moment based on the received control information, to implement a communication function of the communication apparatus.

According to a second aspect, this application provides a data transmission method, including: A universal serial bus USB protocol layer sends first data to a USB adapter layer. The USB adapter layer performs physical link adaptation on the first data to obtain second data, and sends the second data to a transport layer. The first data is adapted to a first physical link, the second data is adapted to a second physical link, and a bandwidth of the first physical link is lower than a bandwidth of the second physical link. The transport layer and a physical layer process the second data, and send processed second data to a receive end through the second physical link.

In a feasible implementation, when the first data includes any one of a token packet, a handshake packet, or a special packet, that the USB adapter layer performs physical link adaptation on the first data to obtain second data includes: The USB adapter layer encapsulates the first data to obtain a first transmission packet, where the second data includes the first transmission packet.

In a feasible implementation, when the first data includes a data packet, that the USB adapter layer performs physical link adaptation on the first data to obtain second data includes: The USB adapter layer splits the data packet into a plurality of first data payloads, and separately encapsulates the plurality of first data payloads to obtain a plurality of second transmission packets, where the second data includes the plurality of second transmission packets.

In a feasible implementation, when the first data further includes a bus event, that the USB adapter layer performs physical link adaptation on the first data to obtain second data includes: When the bus event arrives, the USB adapter layer encapsulates a start part of the bus event to obtain a third transmission packet. That the transport layer and a physical layer process the second data, and send processed second data to a receive end through the second physical link includes: The transport layer and the physical layer process the third transmission packet, and send a processed third transmission packet to the receive end through the second physical link. When the first data further includes the bus event, that the USB adapter layer performs physical link adaptation on the first data to obtain second data further includes: When the bus event ends, the USB adapter layer encapsulates an end part of the bus event to obtain a fourth transmission packet. That the transport layer and a physical layer process the second data, and send processed second data to a receive end through the second physical link further includes: The transport layer and the physical layer process the fourth transmission packet, and send a processed fourth transmission packet to the receive end through the second physical link.

In a feasible implementation, the method includes: The USB protocol layer sends control information to the USB adapter. The USB adapter layer obtains first virtual resistor information from the control information through parsing, and encapsulates the first virtual resistor information to obtain a fifth transmission packet. The transport layer and the physical layer process the fifth transmission packet, and send a processed fifth transmission packet to the receive end through the second physical link. The first virtual resistor information is used to represent a status of a virtual bus by describing an on state or off state of a virtual resistor in a communication apparatus. The virtual bus is a bus that matches the USB protocol layer, and the virtual resistor in the communication apparatus corresponds to a physical resistor. The physical resistor includes at least one of a high-speed termination resistor, a pull-up resistor, or a pull-down resistor.

In a feasible implementation, the first transmission packet, the second transmission packet, the third transmission packet, the fourth transmission packet, and the fifth transmission packet each include a header and a data payload, and the header includes corresponding transmission packet type information, data payload length information, and reliability protection information.

In a feasible implementation, the method further includes: The physical layer and the transport layer process third data received through the second physical link, and send processed third data to the USB adapter layer. The USB adapter layer performs physical link adaptation on the processed third data to obtain fourth data, and sends the fourth data to the USB protocol layer. The third data is adapted to the second physical link and the fourth data is adapted to the first physical link.

In a feasible implementation, when the processed third data includes one or more transmission packets, that the USB adapter layer performs physical link adaptation on the processed third data to obtain fourth data includes: The USB adapter layer separately parses a header or headers of the one or more transmission packets to obtain type information of the one or more transmission packets; and when the one or more transmission packets are data packets, the USB adapter layer aggregates one or more data payloads corresponding to the one or more transmission packets to obtain the fourth data; or when the one or more transmission packets are not data packets, the USB adapter layer uses each of one or more data payloads corresponding to the one or more transmission packets as the fourth data.

In a feasible implementation, the method further includes: The physical layer and the transport layer process a sixth transmission packet received through the second physical link, and send a processed sixth transmission packet to the USB adapter layer. The USB adapter layer receives the processed sixth transmission packet, and parses the processed sixth transmission packet to obtain second virtual resistor information. The second virtual resistor information includes an on state or off state of a virtual resistor at the receive end. The second virtual resistor information is used to represent a status of a virtual bus, and the virtual resistor at the receive end corresponds to a physical resistor. The physical resistor includes at least one of a high-speed termination resistor, a pull-up resistor, or a pull-down resistor.

In a feasible implementation, the method further includes: When the USB adapter layer receives the first data, the USB adapter layer determines the status of the virtual bus based on content of the first data. When the USB adapter layer sends the fourth data, the USB adapter layer determines the status of the virtual bus based on content of the fourth data. When the USB adapter layer neither receives the first data and nor sends the fourth data, the USB adapter layer determines the status of the virtual bus based on the first virtual resistor information and the second virtual resistor information. The USB adapter layer sends the current status of the virtual bus to the USB protocol layer.

In a feasible implementation, the method further includes: The USB protocol layer determines a working status of a communication apparatus at a next moment based on the status of the virtual bus. The working status includes at least one of the following: whether the USB protocol layer sends the first data or whether the USB protocol layer receives sixth data, the content included in the first data when the USB protocol layer sends the first data, or the first virtual resistor information obtained, by the USB adapter layer by parsing the control information, when the USB protocol layer sends the control information.

According to a third aspect, an embodiment of this application provides a terminal device, including the communication apparatus provided in any implementation of the first aspect and a discrete component coupled to the communication apparatus.

According to a fourth aspect, an embodiment of this application provides a communication apparatus. The communication apparatus includes a processor and an interface circuit. The processor may run a computer program to implement the procedure of the data transmission method according to any one of the second aspect through the interface circuit.

According to a fifth aspect, this application provides a computer storage medium, where the computer storage medium stores a computer program. When the computer program is executed by a communication apparatus, the procedure of the data transmission method according to any one of the second aspect is implemented.

According to a sixth aspect, an embodiment of the present invention provides a computer program, where the computer program includes instructions. When the computer program is executed by the foregoing communication apparatus, the communication apparatus can perform the procedure of the data transmission method according to any one of the second aspect.

BRIEF DESCRIPTION OF DRAWINGS

FIG. 9 is a schematic flowchart of a data transmission method according to an embodiment of this application;

DESCRIPTION OF EMBODIMENTS

The following describes embodiments of this application with reference to accompanying drawings in embodiments of this application. In the specification, claims, and the accompanying drawings of this application, the terms "first", "second", "third", "fourth" and so on are intended to distinguish between different objects but do not indicate a particular order. In addition, the terms "including" and "having" and any other variants thereof are intended to cover a non-exclusive inclusion. For example, a process, a method, a system, a product, or a device that includes a series of steps or units is not limited to the listed steps or units, but optionally further includes an unlisted step or unit, or optionally further includes another inherent step or unit of the process, the method, the product, or the device. An "embodiment" mentioned in this specification means that a specific feature, structure, or characteristic described with reference to the embodiment may be included in at least one embodiment of this application. The phrase shown in various locations in the specification may not necessarily refer to a same embodiment, and is not an independent or optional embodiment exclusive from another embodiment. It is explicitly and implicitly understood by a person skilled in the art that embodiments described in the specification may be combined with another embodiment.

Figure 1:
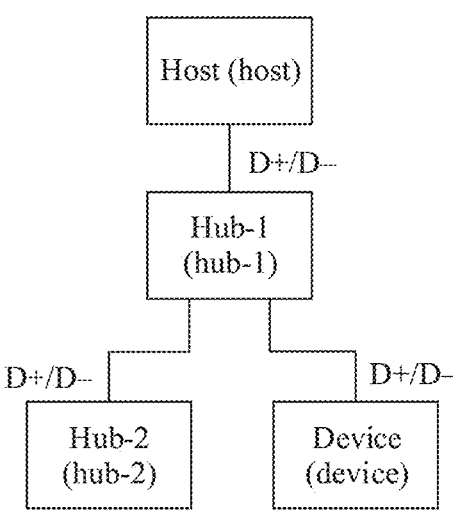
FIG. 1 is a schematic diagram of a tree topology structure of a USB bus according to an embodiment of this application.

FIG. 1 is a schematic diagram of a tree topology structure of a USB bus according to an embodiment of this application. As shown in FIG. 1, FIG. 1 includes four devices: a host (Host), a hub-1 (Hub-1), a hub-2 (Hub-2), and a device (Device). The host is located at a root node. A downstream port of the host is connected to an upstream port of the hub-1 through a USB bus D+/D−. Two downstream ports of the hub-1 are respectively connected to upstream ports of the hub-2 and the device through USB buses. The topology structure of the bus in FIG. 1 corresponds to a specific connection manner of three devices: the host, the hub, and the device. It should be understood that FIG. 1 is merely a specific example provided in this embodiment of this application. A specific topology structure of the USB bus may be determined based on a specific application scenario. For example, the host device may alternatively be directly connected to the device (device). This is not specifically limited in this application.

The host (Host) is responsible for managing all hubs and devices connected to the bus, and may include one or more downstream ports (downstream ports). The host may be a device such as a computer, a tablet, or a mobile phone. The hub provides an expansion capability of a USB port, and includes one upstream port (upstream port) and a plurality of downstream ports. The device provides a specific function, and may be a mobile storage device such as a USB flash drive or a hard disk. This is not specifically limited in this embodiment of this application. The device includes one upstream port.

Figure 2:
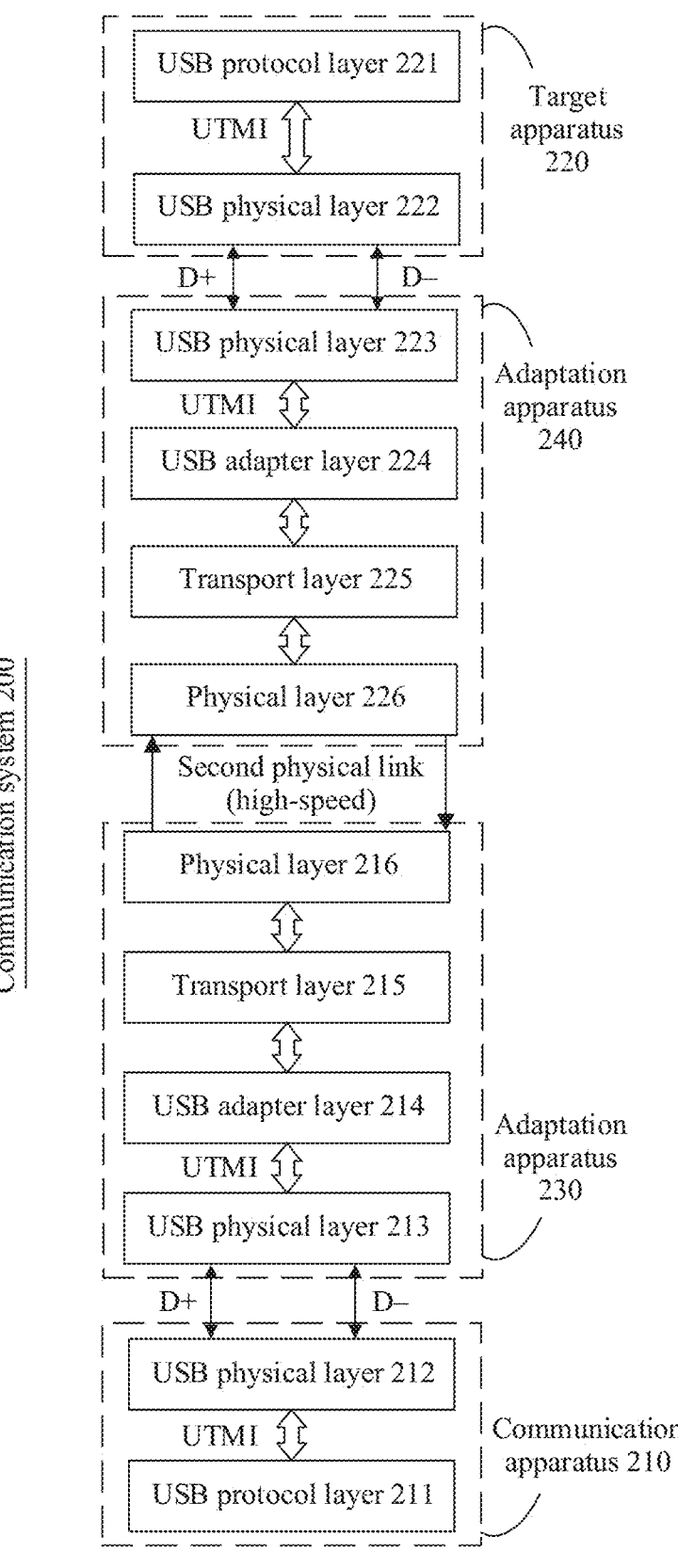
FIG. 2 is a schematic diagram of a structure of a communication system according to an embodiment of this application.

FIG. 2 is a schematic diagram of a structure of a communication system 200 according to an embodiment of this application. As shown in FIG. 2, the communication system 200 includes a communication apparatus 210, a target apparatus 220, an adaptation apparatus 230, and an adaptation apparatus 240. The communication apparatus 210 is connected to the target apparatus 220 through the adaptation apparatus 230, a second physical link, and the adaptation apparatus 240 for communication. Data transmitted between the communication apparatus 210 and the target apparatus 220 may be USB 2.0 data. Based on a specific application scenario, the high-speed second physical link may be configured in a wired form (for example, a copper wire or an optical fiber) or a wireless form (for example, a wireless channel).

Optionally, the communication apparatus 210 and the target apparatus 220 each may be a host (Host) (for example, a computer, a mobile phone, or a tablet) or a device (Device) (for example, a USB flash drive or a hard disk). The communication apparatus 210 and the target apparatus 220 may serve as both upstream ports and downstream ports. When the communication apparatus 210 serves as a downstream port, the target apparatus 220 serves as an upstream port. When the communication apparatus 210 serves as an upstream port, the target apparatus 220 serves as a downstream port. The adaptation apparatus 230 and the adaptation apparatus 240 each may be an adapter, a switch, or the like.

As shown in FIG. 2, structures and functions of apparatuses on both sides of the second physical link are correspondingly the same. Therefore, the following uses apparatuses and a common transmission path on a left side of the second physical link as an example to describe internal structures, functions, and corresponding data transmission processes of the apparatuses.

Optionally, the communication apparatus 210 includes a USB protocol layer (protocol layer) 211 and a USB physical layer (physical layer, PHY) 212. In addition, the communication apparatus 210 may further include an application layer (not shown). The adaptation apparatus 230 includes a USB physical layer 213, a USB adapter layer 214, a transport layer 215, and a physical layer 216.

Optionally, the layers in the communication apparatus 210 and the adaptation apparatus 230 are divided in terms of logical functions, and include corresponding hardware structures (circuits). The application layer (not shown in FIG. 2) in the communication apparatus 210 may provide an interface for an application used for communication and an underlying network for message transmission. The application layer may be a combination of software and hardware. The USB protocol layer 211 defines a language structure and a rule for interaction between a host (Host) and a device (Device). A hardware structure corresponding to the USB protocol layer 211 may be integrated into a USB controller. The USB protocol layer may receive the USB 2.0 data sent by the application layer. The data is transmitted between the USB protocol layer 212 and the USB physical layer 212 through a standard UTMI interface. The USB physical layer 212 receives the USB 2.0 data through the UMTI interface, and converts the USB 2.0 data into a corresponding analog signal. The physical layer may provide a transmission medium and an interconnection device for data communication between communication apparatuses, and provide a reliable environment for data transmission. That is, the physical layer ensures that original data can be transmitted on various physical media. The communication apparatus 210 and the adaptation apparatus 230 are connected through a standard USB port (D+/D−), in other words, the analog signal transmitted by the USB physical layer 212 is transmitted to the USB physical layer 213 through the USB port. The USB physical layer 213 converts the received analog signal into a digital signal, and then transmits the digital signal to the USB adapter layer 214 through an UTMI interface. The USB adapter layer 214 adapts the USB 2.0 data in a form of the digital signal for transmission on the common transmission path and the second physical link. The transport layer 215 is configured to provide a unified transmission interface and a unified data transmission format for data of different protocols, and provide common functions such as scheduling quality of service (quality of service, QoS) assurance, bandwidth allocation, flow control, power consumption management, and connection management for the data of different protocols.

The foregoing describes a process in which the communication apparatus 210 sends the data to the target apparatus 220 through the adaptation apparatus 230. A process in which the communication apparatus 210 receives data through the adaptation apparatus 230 is opposite to the foregoing process, and details are not described herein again. Similarly, processes in which the target apparatus 220 receives data and sends data through the adaptation apparatus 240 are the same as corresponding processes in which the communication apparatus 210 receives data and sends data through the adaptation apparatus 240, and details are not described again.

Figure 3A:
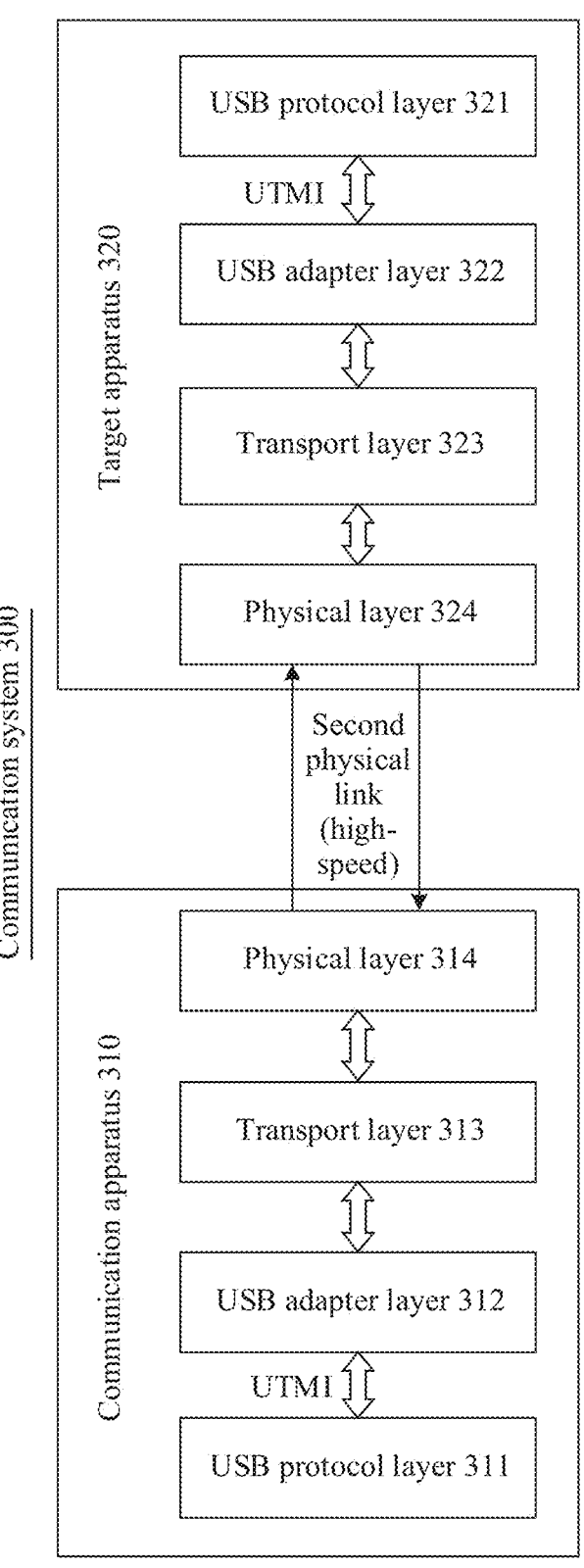
FIG. 3A is a schematic diagram of a structure of another communication system according to an embodiment of this application.

FIG. 3A is a schematic diagram of a structure of another communication system 300 according to an embodiment of this application. As shown in FIG. 3A, the communication system 300 includes a communication apparatus 310 and a target apparatus 320, and the communication apparatus 310 and the target apparatus 320 communicate with each other through a high-speed second physical link. The communication apparatus 310 includes a USB protocol layer (protocol layer) 311, a USB adapter layer (adapter layer) 312, a transport layer (transport layer) 313, and a physical layer (physical layer, PHY) 314. The target apparatus 320 includes a USB protocol layer 321, a USB adapter layer 322, a transport layer 323, and a physical layer 324. It should be understood that functions of the layers included in the communication apparatus 310 are correspondingly the same as functions of the layers included in the target apparatus 320. The layers in the foregoing two apparatuses are divided in terms of logical functions, and each layer includes a corresponding physical circuit (structure). Either of the communication apparatus 310 or the target apparatus 320 may serve as an upstream port or may serve as a downstream port. This is not specifically limited in this application. In this case, the target apparatus 320 may also b e referred to as a receive end.

Optionally, the communication apparatus 310 and the target apparatus 320 each may be a host (Host) (for example, a computer, a mobile phone, or a tablet), a hub (Hub), or a device (Device) (for example, a USB flash drive or a hard disk). This is not specifically limited in this application. For example, the communication apparatus 310 may be a computer, and the target apparatus 320 may be a USB flash drive. In this case, the communication system 300 represents a scenario in which data is transmitted between the computer and the USB flash drive.

Optionally, the communication apparatus 310 and the target apparatus 320 each may further include an application layer (not shown in FIG. 3A). A structure and a function of the application layer may be the same as a structure and a function of the application layer in the embodiment in FIG. 2, and details are not described herein again.

The following uses an example in which a protocol adapted by the USB protocol layer and the USB adapter layer in the communication system 300 is a USB 2.0 protocol (in other words, a protocol of a first physical link is the USB 2.0 protocol), and uses the communication apparatus 310 as an object to describe in detail processes in which the communication apparatus 310 sends data and receives data.

1. Scenario in which the Communication Apparatus 310 Sends the Data to the Target Apparatus 320

The USB protocol layer 311 is configured to send first data to the USB adapter layer 312. The USB protocol layer 311 defines a syntax and a protocol when a USB host interacts with a USB device, and defines structures of a field (field), a packet (packet), a transaction (transaction), and a transfer (transfer), and an organization hierarchical relationship formed from the field to the packet, from the packet to the transaction, and from the transaction to the transfer. In this case, the first data may also be referred to as USB 2.0 data. The packet is a basic unit of data transmission on a USB bus. The USB 2.0 protocol defines four types of packets: a token packet (Token Packet), a data packet (Data Packet), a handshake packet (Handshake packet), and a special packet (Special Packet). The token packet can be sent only from the host, and the data packet and the handshake packet may be sent by the host or the device (Device). Each packet includes different fields, and all packets begin with a synchronization (Synchronization, SYNC) field and end with an end-of-packet (End-of-Packet, EOP) signal. Transmission of the packet cannot be interrupted or interfered. Otherwise, an error may occur. Several packets form one time of transaction transmission, and the transaction transmission cannot be interrupted. The several packets belonging to the transaction transmission need be continuous. One transfer includes one or more times of transaction transmission.

The USB adapter layer 312 is configured to perform physical link adaptation on the first data to obtain second data, and send the second data to the transport layer. The first data is adapted to the first physical link (not shown in FIG. 3A) and the second data is adapted to the second physical link, and a bandwidth of the first physical link is lower than a bandwidth of the second physical link. The first data is protocol layer data.

Optionally, the transport layer and the physical layer are configured to process the second data, and send processed second data to the receive end through the second physical link.

Optionally, the USB adapter layer 312 includes a corresponding physical circuit (structure), and may be integrated into a USB controller. The USB adapter layer 312 may perform, according to a protocol of the second physical link, physical link adaptation on the first data sent by the USB protocol layer 311, to obtain the second data appropriate for transmission on the high-speed second physical link, so as to reuse the first data on the high-speed physical link for transmission, in other words, reuse the USB 2.0 data on the high-speed physical link for transmission. The protocol of the second physical link may be an existing communication protocol, or may be a set of data exchange communication methods set by a person skilled in the art. This is not specifically limited in this application.

Optionally, the first physical link may be a physical link specified in the USB 2.0 protocol, or the first physical link is a transmission link of original USB 2.0 protocol data. A physical form of the first physical link is in a wired form, for example, a copper wire. A transmission rate of the first physical link can be 480 Mbps, 12 Mbps, or 1.5 Mbps. The second physical link is a high-speed physical link whose bandwidth is higher than that of the first physical link. A physical form of the second physical link may be configured based on a specific application scenario, and may be in a wired or wireless form, for example, a copper wire, a wireless channel, or an optical fiber.

For example, when the physical form of the second physical link is the wired form, the communication apparatus is a computer, and the target apparatus is a USB flash drive, and when the communication apparatus performs data transmission with the target apparatus, the second physical link may be a metal sheet (which is generally copper) in contact when the USB flash drive is connected to a USB port of the computer.

Optionally, the transport layer 313 and the physical layer 314 each include a corresponding physical circuit (structure). The transport layer 313 may receive data transmitted to the transport layer 313 by different protocol adapter layers (FIG. 3A shows an adapter layer of only one protocol), and provide a unified transmission interface and a unified data transmission format, in other words, convert a transmission format of the second data into a transmission format specified in the protocol of the second physical link. In addition, the transport layer 313 may further provide common functions such as scheduling quality of service (quality of service, QoS), bandwidth allocation, flow control, power consumption management, and connection management. The physical layer 314 may provide corresponding requirements of line coding, channel coding, and an electrical signal indicator based on a set physical link form. The physical layer 314 may be subdivided into a physical coding sublayer (physical coding sublayer, PCS) and a physical media attachment (physical media attachment, PMA) sublayer, or subdivided into a logical layer (logical layer) and an electrical layer (electrical layer). The physical layer 314 may be specifically configured to perform digital-to-analog conversion, in other words, convert the second data represented by a digital signal into a corresponding analog signal.

In a feasible implementation, when the first data includes any one of the token packet, the handshake packet, or the special packet, the USB adapter layer 312 is specifically configured to encapsulate the first data to obtain a first transmission packet, where the second data includes the first transmission packet.

Optionally, the first data may specifically include any one of the token packet (token packet), the handshake packet (handshake packet), and the special packet (special packet) in the USB 2.0 protocol.

Specifically, the USB adapter layer 312 may encapsulate the first data according to the protocol of the second physical link to obtain the first transmission packet, so that the first transmission packet may be transmitted on the second physical link.

In a feasible implementation, when the first data includes the data packet, the USB adapter layer is specifically configured to: split the data packet into a plurality of first data payloads, and separately encapsulate the plurality of first data payloads to obtain a plurality of second transmission packets, where the second data includes the plurality of second transmission packets.

Optionally, the first data may specifically include the data packet (data packet) in the USB 2.0 protocol.

Optionally, rules of splitting and encapsulating the data packet may be: A starting part of the data packet, for example, starting one-byte data (namely, a packet identifier PID part) or starting two-byte data (a PID part and one byte after the PID) serves as one first data payload. Then, a remaining part of the data packet is split into one or more first data payloads according to a preset rule. The preset rule may be performing average splitting based on a length. This is not specifically limited in this application. Then, all first data payloads obtained through splitting are separately encapsulated into corresponding second transmission packets.

In a feasible implementation, when the first data further includes a bus event, the USB adapter layer is specifically configured to: when the bus event arrives, encapsulate a start part of the bus event to obtain a third transmission packet. The transport layer and the physical layer are specifically configured to process the third transmission packet and send a processed third transmission packet to the receive end through the second physical link. The USB adapter layer is further configured to: when the bus event ends, encapsulate an end part of the bus event to obtain a fourth transmission packet. The transport layer and the physical layer are specifically configured to process the fourth transmission packet and send a processed fourth transmission packet to the receive end through the second physical link.

Specifically, the bus event includes any one of Chirp K, Chirp J, or Resume K in the USB 2.0 protocol. In the USB 2.0 protocol, the bus event is a segment of level signals. For example, a level signal feature of the bus event may be: first changing from a low level 0 to a high level 1, then lasting at the high level 1 for a period of time, and finally changing from the high level 1 to the low level 0. In this segment of level signals, a part that changes from the low level 0 to the high level 1 is the start part of the bus event, a part that changes from the high level 1 to the low level is the end part of the bus event, and the time period lasting at the high level 1 is a middle part of the bus event. In this embodiment of this application, start parts and end parts of the three bus events may be determined according to the rule in the foregoing example.

Optionally, the start parts and the end parts of the three bus events in the USB 2.0 protocol may be respectively represented as: Chirp K Start (Chirp K Start), Resume K Start (Resume K Start), Chirp J Start (Chirp J Start), Chirp K End (Chirp K End), Resume K End (Resume K End), and Chirp J End (Chirp J End). When the first data further includes the bus event, the USB adapter layer 312 may separately encapsulate the start part and the end part of the bus event to obtain the third transmission packet and the fourth transmission packet, where a middle part of the bus event is not encapsulated. Then, the third transmission packet and the fourth transmission packet are separately sent through the transport layer 313, the physical layer 314, and the second physical link. In this case, a process in which the transport layer and the physical layer process the third transmission packet and the fourth transmission packet is the same as a process in which the transport layer and the physical layer process the second data in the foregoing embodiment, and details are not described herein again.

In a feasible implementation, the USB protocol layer is further configured to send control information to the USB adapter. The USB adapter layer is further configured to obtain first virtual resistor information from the control information through parsing, and encapsulate the first virtual resistor information to obtain a fifth transmission packet. The transport layer and the physical layer are specifically configured to process the fifth transmission packet and send a processed fifth transmission packet to the receive end through the second physical link. The first virtual resistor information is used to represent a status of a virtual bus by describing an on state or off state of a virtual resistor in the communication apparatus. The virtual bus is a bus that matches the USB protocol layer, and the virtual resistor in the communication apparatus corresponds to a physical resistor. The physical resistor includes at least one of a high-speed termination resistor, a pull-up resistor, or a pull-down resistor.

Because the communication apparatus 310 in this embodiment of this application may not include a USB 2.0 physical layer or a USB 2.0 pin, there is no physical resistor in the USB 2.0 physical layer. Therefore, the first virtual resistor is introduced to replace the physical resistor in the USB 2.0 physical layer, so that the status of the virtual bus is subsequently determined based on the virtual resistor information, and a communication requirement of the USB 2.0 protocol is met by reporting the status of the virtual bus. When the communication apparatus 310 serves as an upstream port and a downstream port, first virtual resistors included in the communication apparatus 310 are different. When the communication apparatus 310 serves as a downstream port, a first virtual resistor includes a virtual high-speed termination resistor (high-speed termination resistor) and a virtual pull-down resistor (pull-down resistor). When the communication apparatus 310 serves as an upstream port, a first virtual resistor includes a virtual high-speed termination resistor and a virtual pull-up resistor (pull-up resistor). In addition, because the communication apparatus 310 in this embodiment of this application may also not include a physical USB 2.0 bus, the virtual bus is introduced to replace the physical USB 2.0 bus. The virtual bus is a bus that matches the USB 2.0 protocol layer, namely, a virtual USB 2.0 bus. Further, the status of the virtual bus is used to replace a status of the physical USB 2.0 bus, to meet a requirement of the USB2.0 protocol for real-time reporting of the bus status.

Optionally, the first virtual resistor information further includes high impedance (High-Z) information. The high impedance information is used to represent an on state or off state of high impedance, and the high impedance is used to represent a connection status between the communication apparatus 310 and the target apparatus 320 (namely, the receive end). When a communication connection is established between the communication apparatus 310 and the target apparatus 320, the high impedance is in the off state. When no communication connection is established between the communication apparatus 310 and the target apparatus 320, the high impedance is in the on state. The communication connection may be a wired connection or a wireless connection. This is not specifically limited in this application.

Figure 3B:
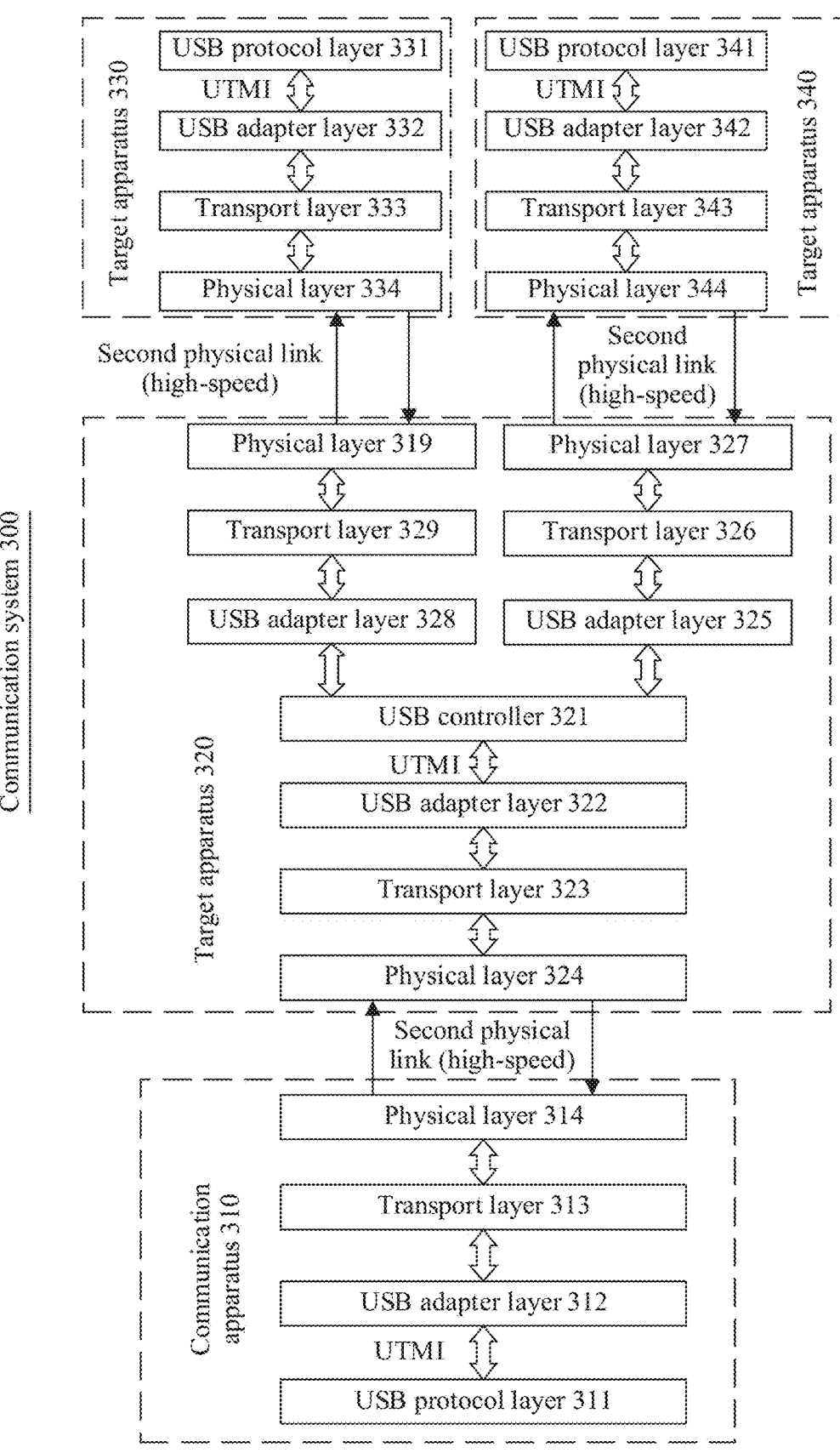
FIG. 3B is a schematic diagram of a structure of still another communication system according to an embodiment of this application.

FIG. 3B is a schematic diagram of a structure of still another communication system 300 according to an embodiment of this application, and serves as a supplement to a communication scenario in FIG. 3A. As shown in FIG. 3B, FIG. 3B includes a communication apparatus 310, a target apparatus 320, a target apparatus 330, and a target apparatus 340.

In FIG. 3B, the communication apparatus 310 extends a connection capability by connecting to the target apparatus 320, to communicate with a plurality of devices (Devices) (only two target apparatuses, namely, the target apparatus 330 and target apparatus 340, are shown in FIG. 3B). In this case, the target apparatus 320 may be a hub (Hub). The target apparatus 330 and the target apparatus 340 each may be a hub (Hub) or a device (Device). When the target apparatus 330 and the target apparatus 340 are hubs (Hubs), an expansion capability of the communication system 300 may be further improved, so that the communication apparatus 310 may perform data transmission with the plurality of devices (Devices).

It should be understood that the communication apparatus 310 may include a plurality of second physical links. FIG. 3B shows only one second physical link. This is not specifically limited in this application. The hub (Hub) may include a plurality of extended second physical links (only two second physical links are shown in FIG. 3B). This is not specifically limited in this application. For a structure and a function of each layer in each apparatus in FIG. 3B, refer to corresponding descriptions in FIG. 3A. Details are not described herein again.

In FIG. 3B, for specific data transmission processes between the communication apparatus 310 and the target apparatus 320, the target apparatus 320 and the target apparatus 330, and the target apparatus 320 and the target apparatus 340, refer to the descriptions in the embodiment in FIG. 3A. Details are not described herein again.

Figure 4:
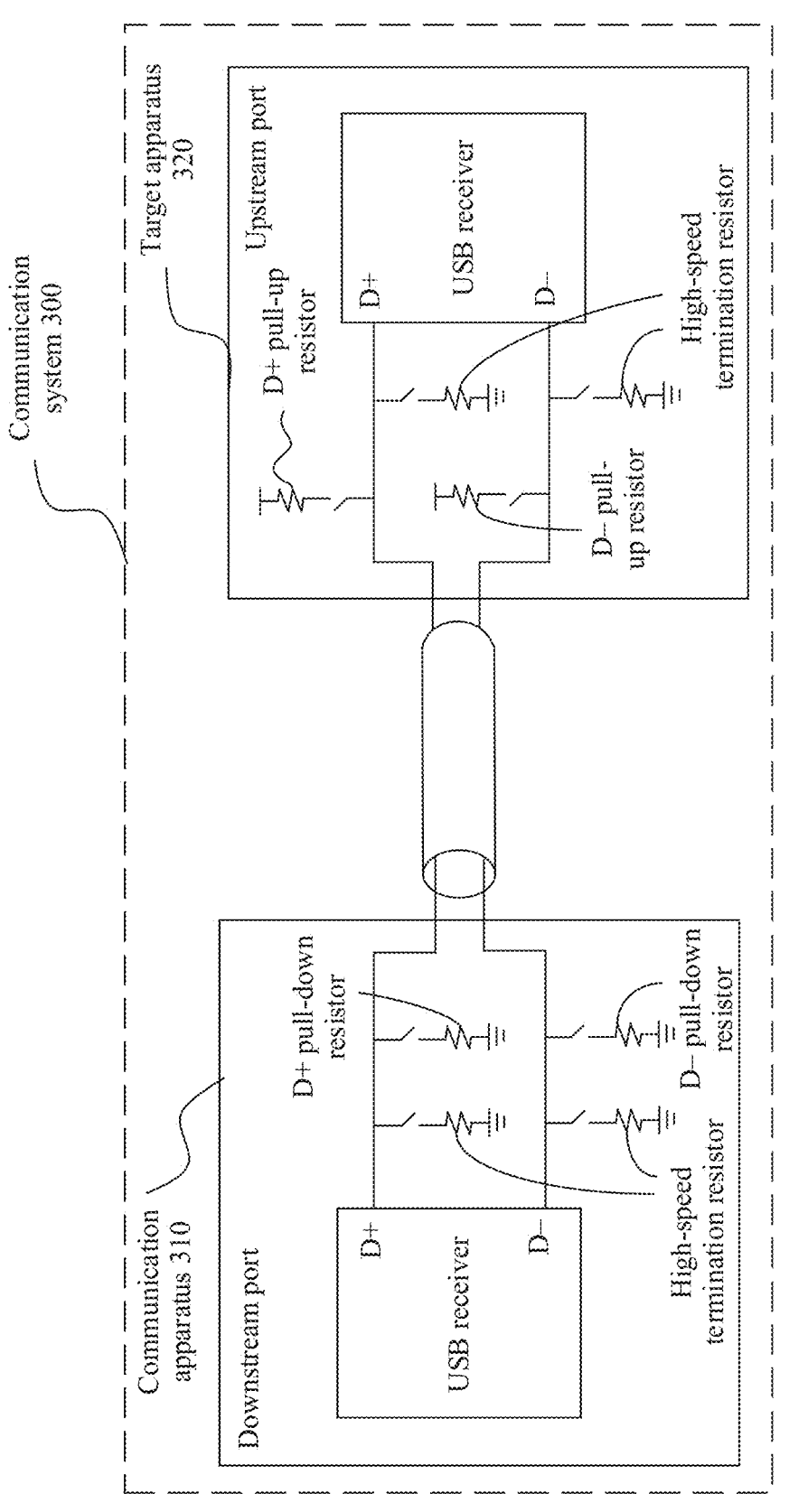
FIG. 4 is a schematic diagram of a structure of a virtual resistor model in a communication system according to an embodiment of this application.

FIG. 4 is a schematic diagram of a structure of a virtual resistor model in a communication system 300 according to an embodiment of this application. The following describes virtual resistors included in the communication system 300 in detail by using FIG. 4 as an example.

A virtual resistor included in a communication apparatus 310 is a first virtual resistor, and a virtual resistor included in a target apparatus 320 (namely, a receive end) is a second virtual resistor. As shown in FIG. 4, when the communication apparatus 310 serves as a downstream port, the target apparatus 320 serves as an upstream port, and the first virtual resistor includes a D+ high-speed termination resistor, a D– high-speed termination resistor, a D+ pull-down resistor, and a D– pull-down resistor on the downstream port. The second virtual resistor includes a D+ high-speed termination resistor, a D– high-speed termination resistor, a D+ pull-up resistor, and a D– pull-up resistor on the upstream port. It should be understood that the communication apparatus 310 and the target apparatus 320 each may serve as both an upstream port and a downstream port. When the communication apparatus 310 serves as an upstream port, and the target apparatus 320 serves as a downstream port, specific virtual resistor types included in the first virtual resistor and the second virtual resistor are exactly opposite to those described above, and details are not described herein again.

It should be noted that the first virtual resistor information may be separately encapsulated to obtain a fifth transmission packet, and then the fifth transmission packet is sent to the target apparatus 320. Alternatively, the bus event or the first data may be encapsulated together and sent together to the target apparatus 320. This is not specifically limited in this embodiment of this application.

It can be learned that because the USB 2.0 physical layer and the pin may not be included in this embodiment of this application, data transmission does not need to pass through the USB 2.0 physical layer, and an intermediate link of data transmission can be reduced. Therefore, a receiving delay of the receive end can be effectively reduced, to meet a requirement of a low delay of a communication protocol, and application is easy. Further, a chip area and related costs can be effectively reduced. In addition, in this embodiment of this application, the virtual resistor and the virtual bus are introduced to respectively replace the physical resistor and the USB 2.0 bus in the USB 2.0 physical layer in the USB 2.0 protocol. In this case, the first virtual resistor information is directly obtained through parsing from the control information, and does not need to be obtained through detection. A speed is faster. Therefore, in this embodiment of this application, the receiving delay of the receive end can be effectively reduced, to better meet the communication requirement of the USB 2.0 protocol. The virtual resistors include the first virtual resistor and the second virtual resistor.

In a feasible implementation, the first transmission packet, the second transmission packet, the third transmission packet, the fourth transmission packet, and the fifth transmission packet each include a header and a data payload, and the header includes corresponding transmission packet type information, data payload length information, and reliability protection information.

Optionally, a feasible header format may be shown in Table 1.

TABLE 1

| Schematic diagram of the packet header format | | |
| --- | --- | --- |
| Reliability protection information | Data payload length information | Transmission packet type information |

As shown in Table 1, information included in each of the headers of the foregoing five transmission packets may sequentially be the reliability protection information, namely, a cyclic redundancy check (cyclic redundancy check, CRC) code, the data payload length (payload length) information, and the transmission packet type (type) information.

The cyclic redundancy check code is a check code with error detection and error correction capabilities. Cyclic redundancy check is a channel coding technology that generates a short fixed-digit check code based on data such as a network data packet or a computer file, and is mainly used to detect or check an error that may occur after data transmission or storage. A transmission packet type includes a non-data packet (non-data packet) type, a data packet start (data packet start, DP Start) type, a data packet middle (data packet middle, DP middle) type, a data packet end (data packet end, DP End) type, and a bus event (bus event) type. The non-data packet type is used to represent the token packet, the handshake packet, and the special packet. The data packet start type, the data packet middle type, and the data packet end type are used to represent data at different locations of the data packet. The bus event type is used to represent virtual resistor information and a bus event.

Optionally, formats of data payloads in the third transmission packet, the fourth transmission packet, and the fifth transmission packet may be shown in Table 2 and Table 3. Table 2 indicates a data payload format corresponding to a downstream port, and Table 3 indicates a data payload format corresponding to an upstream port.

TABLE 2

| Data payload format corresponding to the downstream port | | | | | | | | | | |
| --- | --- | --- | --- | --- | --- | --- | --- | --- | --- | --- |
| CRC | Rsvd | DR off | DR on | HS off | HS on | Hiz on | J End | J Start | K End | K Start |

TABLE 3

| Data payload format corresponding to the upstream port | | | | | | | | | | | |
|---|---|---|---|---|---|---|---|---|---|---|---|
| CRC | MR off | MR on | PR off | PR on | HS off | HS on | Hiz on | J End | J Start | K End | K Start |

As shown in Table 2, the data payload format in Table 2 may be used to represent a data payload included in a transmission packet in which a bus event or virtual resistor information is encapsulated on the upstream port. The data payload format in Table 2 includes 11 information units in total, and identified information is respectively: cyclic redundancy check code, reserved item (Rsvd), pull-down resistor off (Pull-Down Resistor off, DR off), pull-down resistor on (Pull-Down Resistor on, DR on), high-speed termination resistor off (High-Speed Termination Resistor off, HS off), high-speed termination resistor on (High-Speed Termination Resistor on, HS on), high impedance on (High-Z on, Hiz on), bus event J End (J End), bus event J start (J Start), bus event K End (K End), and bus event K Start (K Start).

As shown in Table 3, the data payload format in Table 3 may be used to represent a data payload included in a transmission packet in which a bus event or virtual resistor information is encapsulated on the upstream port. The data payload format in Table 3 includes 12 information elements in total, which are respectively: cyclic redundancy check code, D+ pull-up resistor off (DM Pull-up Resistor off, MR off), D+ pull-up resistor on (DM Pull-up Resistor on, MR on), D– pull-up resistor off (DP Pull-up Resistor off, PR off), D– pull-up resistor on (DP Pull-up Resistor on, PR on), high-speed termination resistor off, high-speed termination resistor on, high-impedance on, bus event J End, bus event J Start, bus event K End, and bus event K Start.

It should be noted that the D+ high-speed termination resistor and D– high-speed termination resistor are on and off at the same time. Therefore, the high-speed termination resistors are represented by one information unit in the data payloads on the upstream port and the downstream port. Two pull-down resistors on the downstream port are on or off at the same time. Therefore, Table 2 uses two information units to indicate statuses of the pull-down resistors. Two pull-up resistors on the upstream port may not be on or off at the same time. Therefore, Table 3 uses four information units to separately represent statuses of the two pull-up resistors. In Tables 2 and 3, J End represents a bus event Chirp J end part, J Start represents a bus event Chirp J start part, K End represents a bus event Chirp K end part or a Resume K end part, and K Start represents a bus event Chirp K start part or a Resume K start part.

It should be understood that Table 2 and Table 3 are merely examples of the data payload format that is of the transmission packet in which the bus event or the virtual resistor information is encapsulated and that is provided in this embodiment of this application. A person skilled in the art may alternatively use another data payload format to represent the bus event and the virtual resistor information. This is not specifically limited in this embodiment of this application.

Figure 5:
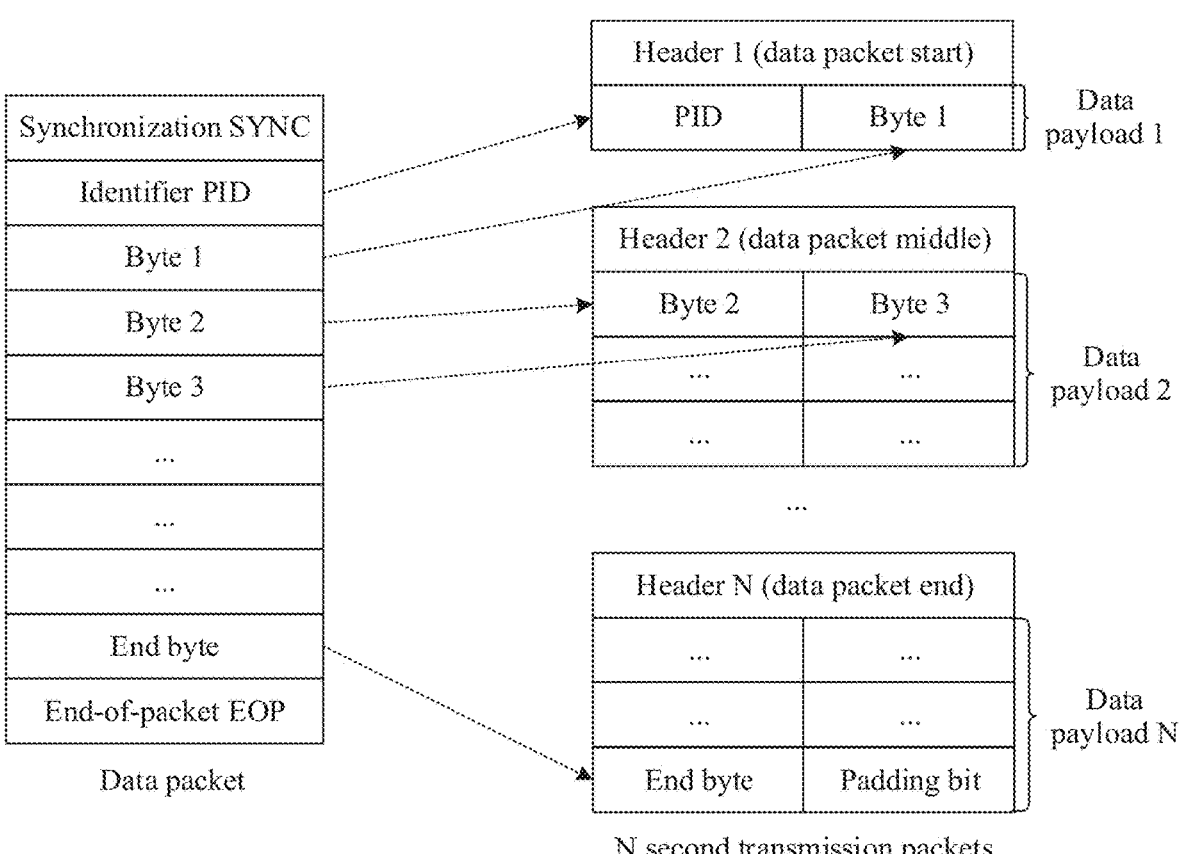
FIG. 5 is a schematic diagram of data packet splitting and encapsulation processes according to an embodiment of this application.

FIG. 5 is a schematic diagram of data packet splitting and encapsulation processes according to an embodiment of this application. As shown in FIG. 5, a data structure of the data packet successively includes a synchronization (synchronization, SYNC) identifier, an identifier (packet identifier, PID), a plurality of bytes (a byte 1 to an end byte), and an end-of-packet (end-of-packet, EOP) delimiter from start to end.

As shown in FIG. 5, the data packet may be split into N data payloads, the identifier PID and the byte 1 are a data payload 1, and the byte 2 to the end byte are split into N–1 data payloads. Then, the USB adapter layer 312 separately encapsulates the divided N data payloads, to obtain N second transmission packets. Each second transmission packet includes a corresponding header and a corresponding data payload. Transmission packet type information included in a header of a first second transmission packet is data packet start DP Start, transmission packet type information included in headers of a 2rd second transmission packet to an $(N-1)^{th}$ second transmission packet is data packet middle DP Middle, and transmission packet type information included in a header of an $N^{th}$ second transmission packet is data packet end DP End. N is a positive integer greater than or equal to 2.

2. Scenario in which the Communication Apparatus 310 Receives the Data Sent by the Target Apparatus 320

In a feasible implementation, the physical layer and the transport layer are further configured to process third data received through the second physical link, and send processed third data to the USB adapter layer. The USB adapter layer is further configured to perform physical link adaptation on the processed third data to obtain fourth data, and send the fourth data to the USB protocol layer. The third data is adapted to the second physical link and the fourth data is adapted to the first physical link.

Specifically, a process in which the physical layer 314 and the transport layer 313 process the third data is exactly opposite to a process in which the physical layer 314 and the transport layer 313 process the second data: An analog signal of the third data is transmitted on the second physical link. The physical layer 314 may be specifically configured to convert the analog signal representing the third data into a corresponding digital signal. The transport layer 313 may be configured to transmit the converted digital signal of the third data, and convert a transmission format of the digital signal into a transmission format adapted to the USB adapter layer 312, in other words, into a transmission format specified in the USB 2.0 protocol.

In a feasible implementation, when the processed third data includes one or more transmission packets, the USB adapter layer is specifically configured to: separately parse a header or headers of the one or more transmission packets to obtain type information of the one or more transmission packets; and when the one or more transmission packets are data packets, aggregate one or more data payloads corresponding to the one or more transmission packets to obtain the fourth data; or when the one or more transmission packets are not data packets, use each of one or more data payloads corresponding to the one or more transmission packets as the fourth data.

Specifically, after receiving the one or more transmission packets, the USB adapter layer 312 is configured to re-assemble the one or more transmission packets to obtain the fourth data that can be received by the USB protocol layer. This process includes: parsing the header or headers of the one or more transmission packets to obtain the type information of the one or more transmission packets from the corresponding headers; when the one or more transmission packets are the data packets, sequentially aggregating data payloads separately included in a DP Start transmission packet, a DP End transmission packet, and M DP Middle transmission packets between the DP Start transmission packet and the DP End transmission packet, to obtain the fourth data, where M is an integer greater than or equal to zero; and when the one or more transmission packets are token packets, special packets, handshake packets, bus event starts, or bus event ends, using each of the data payloads included in the one or more transmission packets as the fourth data.

In a feasible implementation, the physical layer and the transport layer are further configured to process a sixth transmission packet received through the second physical link, and send a processed sixth transmission packet to the USB adapter layer. The USB adapter layer is further configured to receive the processed sixth transmission packet, and parse the processed sixth transmission packet to obtain second virtual resistor information. The second virtual resistor information includes an on state or off state of a virtual downstream port, virtual resistors included in the target apparatus 320 are shown in FIG. 4, and may include a virtual high-speed termination resistor and a virtual pull-down resistor on the downstream port. When the target apparatus 320 serves as an upstream port, virtual resistors may include a virtual high-speed termination resistor and a virtual pull-up resistor on the upstream port.

After receiving the processed sixth transmission packet, the USB adapter layer 312 is further configured to re-assemble the processed sixth transmission packet to obtain the second virtual resistor information. This process specifically includes: parsing a header of the sixth transmission packet to determine a type of the sixth transmission packet, namely, a bus event type; and updating the second virtual resistor information in the communication apparatus 310 based on the second virtual resistor information included in a data payload.

Optionally, the second virtual resistor information further includes high impedance (High-Z) information, and a meaning of the high impedance information is the same as a meaning represented by the high impedance in the first virtual resistor information. Details are not described herein again.

TABLE 4

Correspondence between virtual resistor information and a status of a virtual bus

| Downstream port | | | Upstream port | | | | Down- | | |
| High impedance | High-speed termination resistor | Pull-down resistor | High impedance | High-speed termination resistor | D+ pull-up resistor | D− pull-up resistor | stream port line state | Upstream port line state | Virtual bus status |
| --- | --- | --- | --- | --- | --- | --- | --- | --- | --- |
| ON | X | X | X | X | X | X | X | X | High impedance (driven) on the downstream port |
| OFF | OFF | ON | ON | X | X | X | SE0 | X | High impedance (driven) on the upstream port |
| OFF | OFF | ON | OFF | OFF | ON | OFF | J | J | FS default state |
| OFF | OFF | ON | OFF | OFF | OFF | ON | K(LS J) | K(LS J) | LS default state |
| OFF | ON | X | OFF | ON | X | X | SE0 | SE0 | HS default state |
| OFF | ON | X | OFF | OFF | ON | OFF | SE0 | SE0 | HS - handshake |
| OFF | ON | X | OFF | OFF | OFF | ON | SE0 | SE0 | HS handshake | resistor at the receive end. The second virtual resistor information is used to represent a status of a virtual bus, and the virtual resistor at the receive end corresponds to a physical resistor. The physical resistor includes at least one of a high-speed termination resistor, a pull-up resistor, or a pull-down resistor.

A process in which the physical layer 314 and the transport layer 313 process the sixth transmission packet is the same as a process in which the physical layer 314 and the transport layer 313 process the third data, and details are not described herein again. The receive end is the target apparatus 320. When the target apparatus 320 serves as a In a feasible implementation, the USB adapter layer is further configured to: when the USB adapter layer receives the first data, determine the status of the virtual bus based on content of the first data; when the USB adapter layer sends the fourth data, determine the status of the virtual bus based on content of the fourth data; or when the USB adapter layer neither receives the first data and nor sends the fourth data, determine the status of the virtual bus based on the first virtual resistor information and the second virtual resistor information; and send the current status of the virtual bus to the USB protocol layer.

Specifically, the first data may include a token packet, a handshake packet, a special packet, a data packet, or a bus event, and the fourth data may also include a token packet, a handshake packet, a special packet, a data packet, or a bus event.

Optionally, when the USB adapter layer 312 receives the first data, the determining the status of the virtual bus based on content of the first data specifically includes: when the USB adapter layer 312 receives the token packet, the handshake packet, the special packet, the data packet, or the bus event from the USB protocol layer 311, determining the status of the virtual bus according to a USB transceiver macrocell interface (UTMI) protocol, in other words, based on a correspondence between the content of the first data and the bus status.

Optionally, when the USB adapter layer 312 sends the fourth data, the determining the status of the virtual bus based on content of the fourth data specifically includes: when the USB adapter layer 312 sends the token packet, the handshake packet, the special packet, the data packet, or the bus event to the USB protocol layer 311, determining the status of the virtual bus according to the UTMI protocol, in other words, based on a correspondence between the content of the fourth data and the bus status. For example, when the received fourth data is a bus event start part, the status (line_state) of the virtual bus is correspondingly determined as K or J based on the type of the bus event. When the received fourth data is a bus event end part, it is determined that the status of the virtual bus is SE0 (namely, SE0 in the USB 2.0 protocol). Correspondences between other USB 2.0 transmission packets, bus events, and bus statuses specified in the UTMI protocol are not described herein again.

Optionally, when the USB adapter layer neither receives the first data and nor sends the fourth data, the status of the virtual bus is determined based on the correspondence between the virtual resistor and the status of the virtual bus in Table 4.

The relevant Chinese and English identifiers in Table 4 are explained below: ON indicates turning on, OFF indicates turning off, X indicates no impact on determining the status of the virtual bus, FS refers to a full speed (full speed) in the USB 2.0, LS refers to a low speed (low speed) in the USB 2.0, and HS refers to a high speed (high speed) in the USB 2.0. For related meanings of the J state, the K state, and the SE0 state, refer to the USB 2.0 protocol, and details are not described herein again. There are six virtual bus states in total: high impedance (driven) on the downstream port, high impedance (driven) on the upstream port, FS default state, LS default state, HS default state, and HS handshake (handshake) in the USB 2.0 protocol.

In a feasible implementation, the USB adapter layer is further configured to determine a working status of the communication apparatus at a next moment based on the status of the virtual bus. The working status includes at least one of the following: whether the USB protocol layer sends the first data or whether the USB protocol layer receives sixth data, the content included in the first data when the USB protocol layer sends the first data, the first virtual resistor information obtained, by the USB adapter layer by parsing the control information, when the USB protocol layer sends the control information, or an idle state.

Specifically, the working status of the communication apparatus 310 at the next moment includes the following: (1)

The USB protocol layer 311 sends the first data and the specific content included in the first data to the USB adapter layer 312. (2) The USB protocol layer 311 receives the sixth data sent by the USB adapter layer 312. (3) The USB protocol layer 311 sends the control information to the USB adapter layer 312, and the USB adapter layer 312 may obtain the corresponding first virtual resistor information from the control information through parsing. (4) In the idle state, the USB protocol layer 311 neither sends the first data nor receives the sixth data.

It should be noted that the foregoing division into working statuses refers to specific behavior of the communication apparatus 310 at a moment. Different working modes of the communication apparatus are described in detail below with reference to FIG. 6, and the working mode refers to specific behavior of the communication apparatus 310 in a period of time.

It should be understood that specific processes in which the target apparatus 320 (the receive end) sends data and receives data are the same as specific processes in which the communication apparatus 310 sends data and receives data. When the communication apparatus 310 sends data, the target apparatus 320 receives the data. When the target apparatus 320 sends data, the communication apparatus 310 receives the data. Therefore, the processes in which the target apparatus 320 sends data and receives data are not described again in this embodiment of this application.

Figure 6:
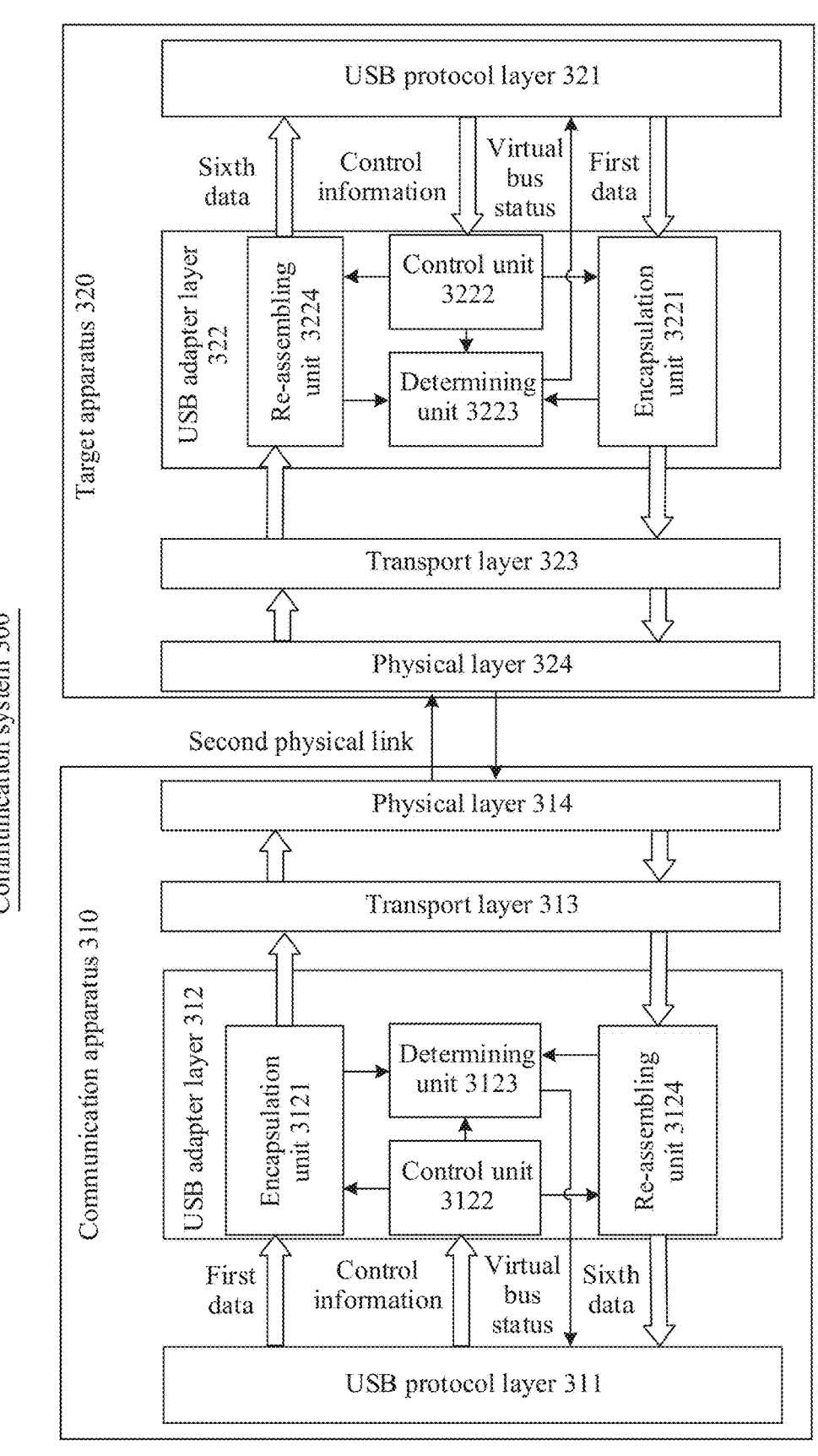
FIG. 6 is a schematic diagram of a structure of yet another communication system according to an embodiment of this application.

In a feasible implementation, refer to FIG. 6. FIG. 6 is a schematic diagram of a structure of yet another communication system 300 according to an embodiment of this application, and serves as a detailed description of the USB adapter layer in FIG. 3A, FIG. 3B, FIG. 7, or FIG. 8A to FIG. 8C. As shown in FIG. 6, for the communication apparatus 310, the USB adapter layer 312 of the communication apparatus 310 includes an encapsulation unit 3121, a control unit 3122, a determining unit 3123, and a re-assembling unit 3124.

The control unit 3122 is configured to: receive the control information sent by the USB protocol layer 311, determine the working mode of the communication apparatus 310 based on the control information, and obtain the corresponding first virtual resistor information from the control information through parsing. The control unit 3122 controls, based on the determined working mode, whether the encapsulation unit 3121 encapsulates the first data and the first virtual resistor information, controls whether the re-assembling unit 3124 re-assembles the third data, and controls whether the determining unit 3123 infers the status of the virtual bus.

The encapsulation unit 3121 is configured to: receive the first data and encapsulate the first data to obtain the second data, and encapsulate, when the first virtual resistor information obtained through parsing this time is different from first virtual resistor information obtained through parsing last time, the first virtual resistor information this time to obtain the fifth transmission packet.

The re-assembling unit 3124 is configured to: receive and re-assemble the third data to obtain the fourth data, receive and re-assemble the sixth transmission packet to obtain the second virtual resistor information, and update, by using the second virtual resistor information obtained this time, second virtual resistor information obtained last time.

The determining unit 3123 is configured to: when the encapsulation unit 3121 encapsulates the first data, determine the status of the virtual bus based on the correspondence that is between the content of the encapsulated first data and the bus status and that is specified in the UTMI protocol; or when the re-assembling unit 3124 sends the fourth data to the USB protocol layer 311, determine the status of the virtual bus based on the correspondence that is between the specific content of the fourth data and the bus status and that is specified in the UTMI protocol; or when the encapsulation unit 3121 does not receive the first data and the re-assembling unit 3124 does not send the fourth data, determine the status of the virtual bus based on the correspondence between the virtual resistor and the status of the virtual bus in Table 4; and send the status of the virtual bus to the USB protocol layer 311.

It should be understood that functions of an encapsulation unit 3221, a control unit 3222, a determining unit 3223, and a re-assembling unit 3224 included in the USB adapter layer 322 in the target apparatus 320 respectively correspond to and are the same as functions of the encapsulation unit 3121, the control unit 3122, the determining unit 3123, and the re-assembling unit 3124 included in the USB adapter layer 312, and details are not described herein again. Each functional unit included in each of the target apparatus 320 and the communication apparatus 310 includes a corresponding hardware circuit.

The following describes in detail, by using Table 5 to Table 8, working modes of the communication apparatus 310 corresponding to different control information, and specific behavior of the communication apparatus 310 in different working modes.

The control information may include a plurality of types of control signals in the USB 2.0 protocol: utmi_dppulldown, utmi_dmpulldown, utmi_suspendm, utmi_xcvrselect, utmi_termselect, utmi_opmode, and utmi_txvaild. The control information is the same as control information specified in the UTMI protocol. Details are not described again in this application. When utmi_dppulldown or utmi_dmpulldown is 1, the communication apparatus 310 serves as a downstream port, in other words, the USB adapter layer 312 is located on the downstream port. When utmi_dppulldown or utmi_dmpulldown is 0, the communication apparatus 310 serves as an upstream port, in other words, the USB adapter layer 312 is located on the upstream port. A combination of the foregoing plurality of types of control signals corresponds to different working modes of the communication apparatus 310.

Refer to Table 5 and Table 6. Table 5 shows that when the communication apparatus 310 serves as a downstream port, 13 working modes of the communication apparatus 310 may be determined based on a combination of the five types of control signals: utmi_suspendm, utmi_xcvrselect, utmi_termselect, utmi_opmode, and utmi_txvaild. "X" in Table 5 indicates that the signal has no impact on determining the working mode. The following uses a signal "01b" as an example to explain a meaning of each signal: "b" indicates that the signal is in a binary format, and "01" indicates a specific value of the signal. Meanings of other signal values are similar, and details are not described again.

The foregoing 13 working modes are working modes of the downstream port in the UTMI protocol. As shown in Table 6, "packet" in Table 6 refers to data other than the bus event in the first data or the fourth data, namely, any one of the token packet, the handshake packet, the special packet, and the data packet. The full speed, the high speed, and the low speed refer to a full speed (12 Mbps), a high speed (480

Mbps), and a low speed (1.5 Mbps) in the USB 2.0 protocol, respectively. "X" indicates no impact; "data" indicates any one of the token packet, the handshake packet, the special packet, and the data packet; "ON" indicates in a working state; "OFF" indicates in a non-working state; and "OFF/ON" indicates in the working state or in the non-working state. In a signal value "FFh" of utmi_txdata, "h" indicates that the value is a hexadecimal number, and "FF" indicates a specific value of the signal.

It should be noted that, in a preamble (preamble) (packet sent) working mode, if a sent packet is a preamble packet, from the end of this packet to the start of a next packet, the status of the virtual bus is a full-speed J state in the USB 2.0 protocol, that is, FS J.

Behavior of the communication apparatus in different working modes in Table 6 is described below by using examples. For example, a "high-impedance" working mode indicates that no communication connection is established between the communication apparatus 310 and another apparatus at this time, and neither a corresponding high-speed termination resistor nor a corresponding pull-down resistor is on. The "standby" working mode indicates that a communication connection is established between the communication apparatus 310 and the target apparatus 320. In this case, only a bus event is encapsulated and re-assembled, and the status of the virtual bus is determined. A corresponding high-speed termination resistor is not on, and a corresponding pull-down resistor is on. A full-speed mode includes three working modes shown in Table 6: full-speed (idle), full-speed (packet sent), and full-speed (Resume K sent). A high-speed mode includes four working modes shown in Table 6: high-speed (idle), high-speed (packet sent), high-speed (Chirp J sent), and full-speed (Chirp K sent). A low-speed mode includes three working modes shown in Table 6: low-speed (idle), low-speed (packet sent), and low-speed (Resume K sent). The "full-speed (idle)" working mode indicates that at this time, the communication apparatus 310 encapsulates and re-assembles the bus event, re-assembles the token packet, the handshake packet, the special packet, and the data packet that are sent by the target apparatus 320, and determines the status of the virtual bus. At this time, a corresponding high-speed termination resistor is not on, and a corresponding pull-down resistor is on. The "full-speed (packet sent)" working mode indicates that at this time, the communication apparatus 310 encapsulates and re-assembles the bus event, encapsulates and re-assembles the token packet, the handshake packet, the special packet, and the data packet, and determines the bus event. At this time, a corresponding high-speed termination resistor is not on, and a corresponding pull-down resistor is on. The "full-speed (Resume K sent)" working mode indicates that at this time, the communication apparatus 310 encapsulates and re-assembles the start and end parts of the bus event Resume K, and determines the status of the virtual bus. The behavior of the communication apparatus 310 in the five working modes in Table 6 are described in detail above. For specific behavior of the communication apparatus 310 in other working modes, refer to Table 6. Details are not described herein again.

TABLE 5

Correspondence between control information corresponding to the
downstream port and a working mode of the communication apparatus

| Working mode | Control information | | | | |
|---|---|---|---|---|---|
| | utmi_suspendm | utmi_xcvrselect | utmi_termselect | utmi_opmode [1:0] | utmi_txvaild |
| High impedance | X | X | X | 01b | X |
| Standby | 0b | X | X | X | X |
| Full-speed (idle) | 1b | 01b | 1b | 00b | 0b |
| Full-speed (packet sent) | 1b | 01b | 1b | 00b | 1b |
| Full-speed (Resume K sent) | 1b | 01b | 1b | 10b | 1b |
| High-speed (idle) | 1b | 00b | 0b | 10b | 0b |
| High-speed (Chirp J sent) | 1b | 00b | 0b | 10b | 1b |
| High-speed (Chirp K sent) | 1b | 00b | 0b | 10b | 1b |
| High-speed (packet sent) | 1b | 00b | 0b | 10b | 1b |
| Low-speed (idle) | 1b | 10b | 1b | 00b | 0b |
| Low-speed (packet sent) | 1b | 10b | 1b | 00b | 1b |
| Low-speed (Resume K sent) | 1b | 10b | 1b | 10b | 1b |
| Preamble (Preamble) (packet sent) | 1b | 11b | 1b | 00b | 1b |

TABLE 6

Virtual resistor information and the specific behavior of the control
unit that correspond to different working modes of the downstream port

| Working mode | Send | Virtual resistor information | | Behavior of the control unit | | | |
|---|---|---|---|---|---|---|---|
| | data utmi_txdata [7:0] | High-speed termination resistor | Pull-down resistor | Bus event encapsulation and re-assembly | Encapsulate a packet | Re-assemble the packet | Determine the status of the virtual bus |
| High impedance | X | OFF | OFF | OFF | OFF | OFF | X |
| Standby | X | OFF | ON | ON | OFF | OFF | ON |
| Full-speed (idle) | X | OFF | ON | ON | OFF | ON | ON |
| Full-speed (packet sent) | data | OFF | ON | ON | ON | OFF | ON |
| Full-speed (Resume K sent) | 00h | OFF | ON | ON | OFF | OFF | ON |
| High-speed (idle) | X | ON | OFF/ON | ON | OFF | ON | ON |
| High-speed (Chirp J sent) | FFh | ON | OFF/ON | ON | OFF | OFF | ON |
| High-speed (Chirp K sent) | 00h | ON | OFF/ON | ON | OFF | OFF | ON |
| High-speed (packet sent) | data | ON | OFF/ON | ON | ON | OFF | ON |
| Low-speed (idle) | X | OFF | ON | ON | OFF | ON | ON |

TABLE 6-continued

| | | Virtual resistor | | Behavior of the control unit | | | |
| | | information | | Bus event | | Re- | |
| Working mode | Send data utmi_txdata [7:0] | High-speed termination resistor | Pull-down resistor | encapsulation and re-assembly | Encapsulate a packet | assemble the packet | Determine the status of the virtual bus |
|---|---|---|---|---|---|---|---|
| Low-speed (packet sent) | data | OFF | ON | ON | ON | OFF | ON |
| Low-speed (Resume K sent) | 00h | OFF | ON | ON | OFF | OFF | ON |
| Preamble (Preamble) (packet sent) | data | OFF | ON | ON | ON | OFF | ON |

Refer to Table 7 and Table 8. Table 7 shows that when the communication apparatus 310 serves as an upstream port, 12 working modes of the communication apparatus 310 may be determined based on a combination of the five types of control signals: utmi_suspendm, utmi_xcvrselect, utmi_termselect, utmi_opmode, and utmi_txvaild. It should be noted that, when the communication apparatus 310 serves as the upstream port, there is no preamble (Preamble) (packet sent) working mode. Specific meanings represented by various signal values in Table 7 are the same as interpretation rules of meanings in Table 5, and meanings represented by signal values in Table 8 are the same as interpretation rules of meanings of signal values in Table 6. Details are not described herein again.

The foregoing 12 working modes are working modes of the upstream port in the UTMI protocol. As shown in Table 8, the terms "packet", "full speed", "low speed" and "high speed" in Table 8 have the same meaning as the related terms in Table 6. Interpretation rules of the signal values of the utmi_txdata, the virtual resistor information, and the behavior of the control unit in Table 8 are the same as interpretation rules of the corresponding signal values in Table 6, and details are not described herein again. For specific behavior of the communication apparatus 310 in different working modes, refer to Table 8. Details are not described herein again.

It should be noted that in the full-speed (idle) working mode, if the received packet is a preamble packet, bitwise inversion is performed on data in a next packet. For example, if a data format in the next packet is binary, 0 in a binary data bit is changed to 1 or 1 is changed to 0. Then, from the end of this packet to the start of the next packet, the status of the virtual bus is in the full-speed J state, that is, FS J.

It should be noted that the preamble (Preamble) mode does not exist at the upstream port. Therefore, a case of sending the preamble packet does not need to be considered, but a case of receiving a preamble packet needs to be considered. At the downstream port, only a case of sending a preamble packet needs to be considered, but a case of receiving a preamble packet does not need to be considered. The upstream port can support only the low-speed LS mode, the high-speed HS mode, or the full-speed FS mode. Generally, the upstream port supports the high-speed HS mode or full-speed FS mode. The low-speed LS mode does not need to be considered. A low-speed start-of-frame (low-speed start-of-frame, LS SOF/LS Keepalive) packet is sent only through the downstream port. Therefore, the downstream port only needs to consider sending of LS Keepalive, and does not consider receiving of LS Keepalive. The upstream port only needs to consider receiving of LS Keepalive, and does not consider sending of LS Keepalive.

It should be understood that Tables 5 to 8 describe, by using the communication apparatus 310 as an example, correspondences between the control information sent by the USB protocol layer 311 and working modes of the communication apparatus 310 when the communication apparatus 310 serves as an upstream port and a downstream port, and specific behavior of the communication apparatus 310 in different working modes. When the target apparatus 320 performs communication as an upstream port or a downstream port, the target apparatus 320 also follows the corresponding rules in Table 5 to Table 8, and details are not described herein again.

TABLE 7

Correspondence between control information corresponding to the upstream port and a working mode of the communication apparatus

| | Control information | | | | |
| Working mode | utmi_suspendm | utmi_xcvrselect | utmi_termselect | utmi_opmode [1:0] | utmi_txvaild |
|---|---|---|---|---|---|
| High impedance | X | X | X | 01b | X |
| Standby | 0b | X | X | X | X |
| Full-speed (idle) | 1b | 01b | 1b | 00b | 0b |
| Full-speed (packet sent) | 1b | 01b | 1b | 00b | 1b |

TABLE 7-continued

Correspondence between control information corresponding to the
upstream port and a working mode of the communication apparatus

| | Control information | | | | |
|---|---|---|---|---|---|
| Working mode | utmi_suspendm | utmi_xcvrselect | utmi_termselect | utmi_opmode [1:0] | utmi_txvaild |
| Full-speed (Resume K sent) | 1b | 01b | 1b | 10b | 1b |
| High-speed (idle) | 1b | 00b | 0b | 10b | 0b |
| High-speed (Chirp J sent) | 1b | 00b | 0b | 10b | 1b |
| High-speed (Chirp K sent) | 1b | 00b | 0b | 10b | 1b |
| High-speed (packet sent) | 1b | 00b | 0b | 10b | 1b |
| Low-speed (idle) | 1b | 10b | 1b | 00b | 0b |
| Low-speed (packet sent) | 1b | 10b | 1b | 00b | 1b |
| Low-speed (Resume K sent) | 1b | 10b | 1b | 10b | 1b |

TABLE 8

Virtual resistor information and the specific behavior of the control
unit that correspond to different working modes of the upstream port

| | Virtual resistor information | | | Behavior of the control unit | | | |
|---|---|---|---|---|---|---|---|
| Working mode | Send data utmi_txdata [7:0] | High-speed termination resistor | Pull-up resistor | Bus event encapsulation and re-assembly | Encapsulate a packet | Re-assemble the packet | Determine the status of the virtual bus |
| High impedance | X | OFF | OFF | OFF | OFF | OFF | X |
| Standby | X | OFF | ON | ON | OFF | OFF | ON |
| Full-speed (idle) | X | OFF | ON | ON | OFF | ON | ON |
| Full-speed (packet sent) | data | OFF | ON | ON | ON | OFF | ON |
| Full-speed (Resume K sent) | 00h | OFF | ON | ON | OFF | OFF | ON |
| High-speed (idle) | X | ON | OFF | ON | OFF | ON | ON |
| High-speed (Chirp J sent) | FFh | ON | OFF | ON | OFF | OFF | ON |
| High-speed (Chirp K sent) | 00h | ON | OFF | ON | OFF | OFF | ON |
| High-speed (packet sent) | data | ON | OFF | ON | ON | OFF | ON |
| Low-speed (idle) | X | OFF | ON | ON | OFF | ON | ON |
| Low-speed (packet sent) | data | OFF | ON | ON | ON | OFF | ON |
| Low-speed (Resume K sent) | 00h | OFF | ON | ON | OFF | OFF | ON |

Figure 7:
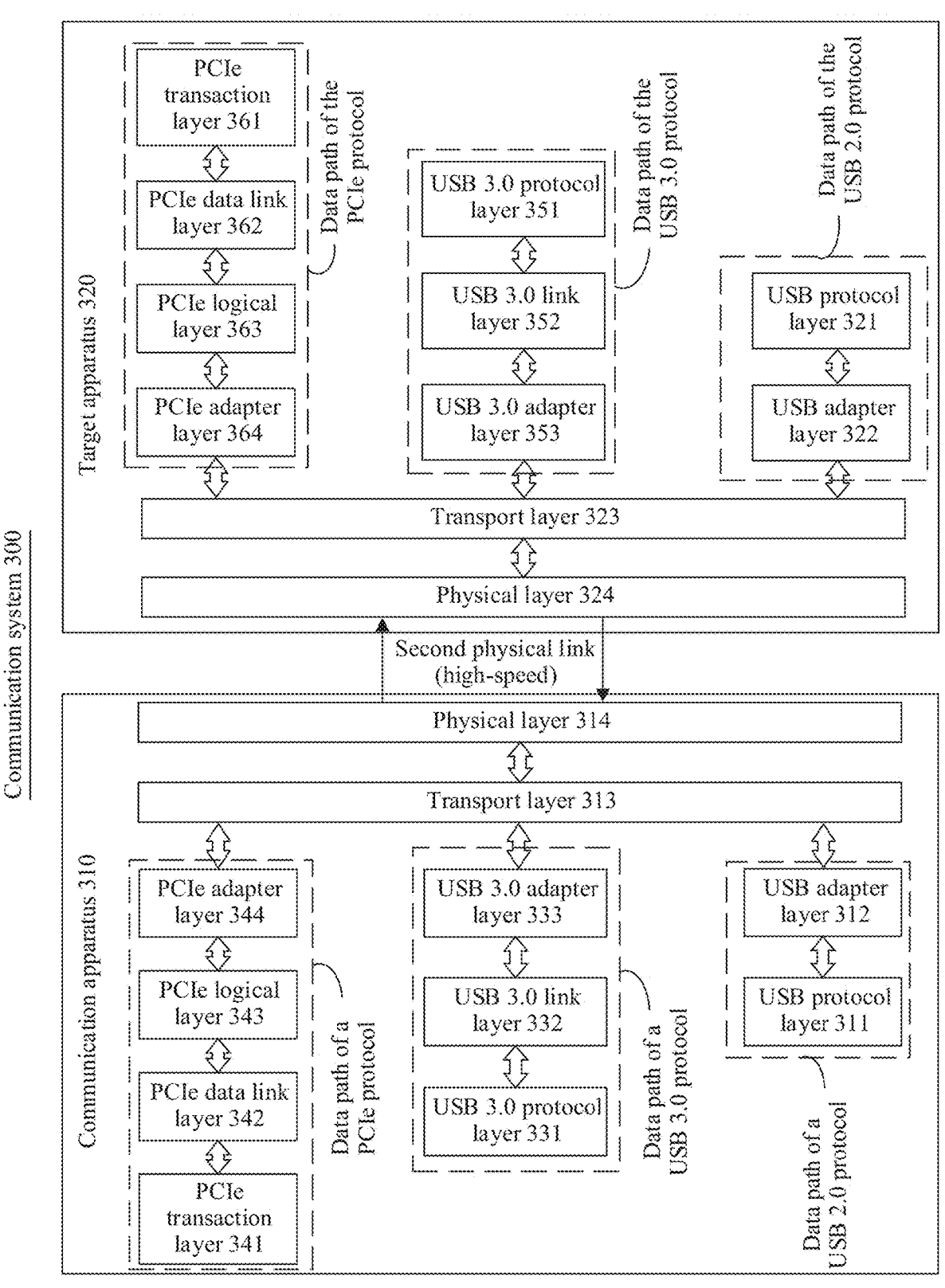
FIG. 7 is a schematic diagram of a structure of still another communication system according to an embodiment of this application.

FIG. 7 is a schematic diagram of a structure of still another communication system 300 according to an embodiment of this application. As shown in FIG. 7, a communication apparatus 310 and a target apparatus 320 each include data transmission paths of a plurality of protocols. To be specific, in addition to a data transmission path of a USB 2.0 protocol, the foregoing two communication apparatuses each further include a USB 3.0 data transmission path and a data transmission path of a PCIe protocol. A structure shown in the communication apparatus 310 in FIG. 7 is correspondingly the same as that shown in the target apparatus 320 in FIG. 7.

As shown in FIG. 7, the communication apparatus 310 includes the data transmission path of the USB 2.0 protocol, the data transmission path of the USB 3.0 protocol, and the data transmission path of the PCIe protocol. The three protocols include respective independent data transmission paths above respective adapter layers. Below the adapter layers, a transport layer 313, a physical layer 314, and a second physical link are shared for data transmission. The data transmission path of the USB 2.0 protocol is the transmission path shown in FIG. 3A. A specific data communication rule of the data transmission path of the USB 2.0 protocol is described in detail in the foregoing embodiment, and details are not described herein again. The data transmission path of the USB 3.0 protocol includes a USB 3.0 adapter layer 333, a USB 3.0 link layer 332, and a USB 3.0 protocol layer 331 above the transport layer 313. The data transmission path of the PCIe protocol includes a PCIe adapter layer 344, a PCIe logical layer 343, a PCIe data link layer 342, and a PCIe transaction layer 341 above the transport layer 313. The data transmission paths of the foregoing three protocols should further include corresponding application layers (not shown) above respective protocol layers.

It should be understood that the communication apparatus 310 in this embodiment of this application may be a multi-protocol aggregation communication apparatus (as shown in FIG. 7, the USB 2.0 protocol and another communication protocol are included), or may be a single-protocol communication apparatus (as shown in FIG. 3A or FIG. 3B, the USB 2.0 protocol is included). This is not specifically limited in this application. In addition, for the multi-protocol aggregation communication apparatus 310 shown in FIG. 7, in addition to being aggregated with the USB 3.0 protocol and the PCIe protocol, the USB 2.0 protocol in the apparatus may also be aggregated with one or more other protocols, to implement transmission on the common high-speed second physical link. This is not specifically limited in this application.

Figure 8A:
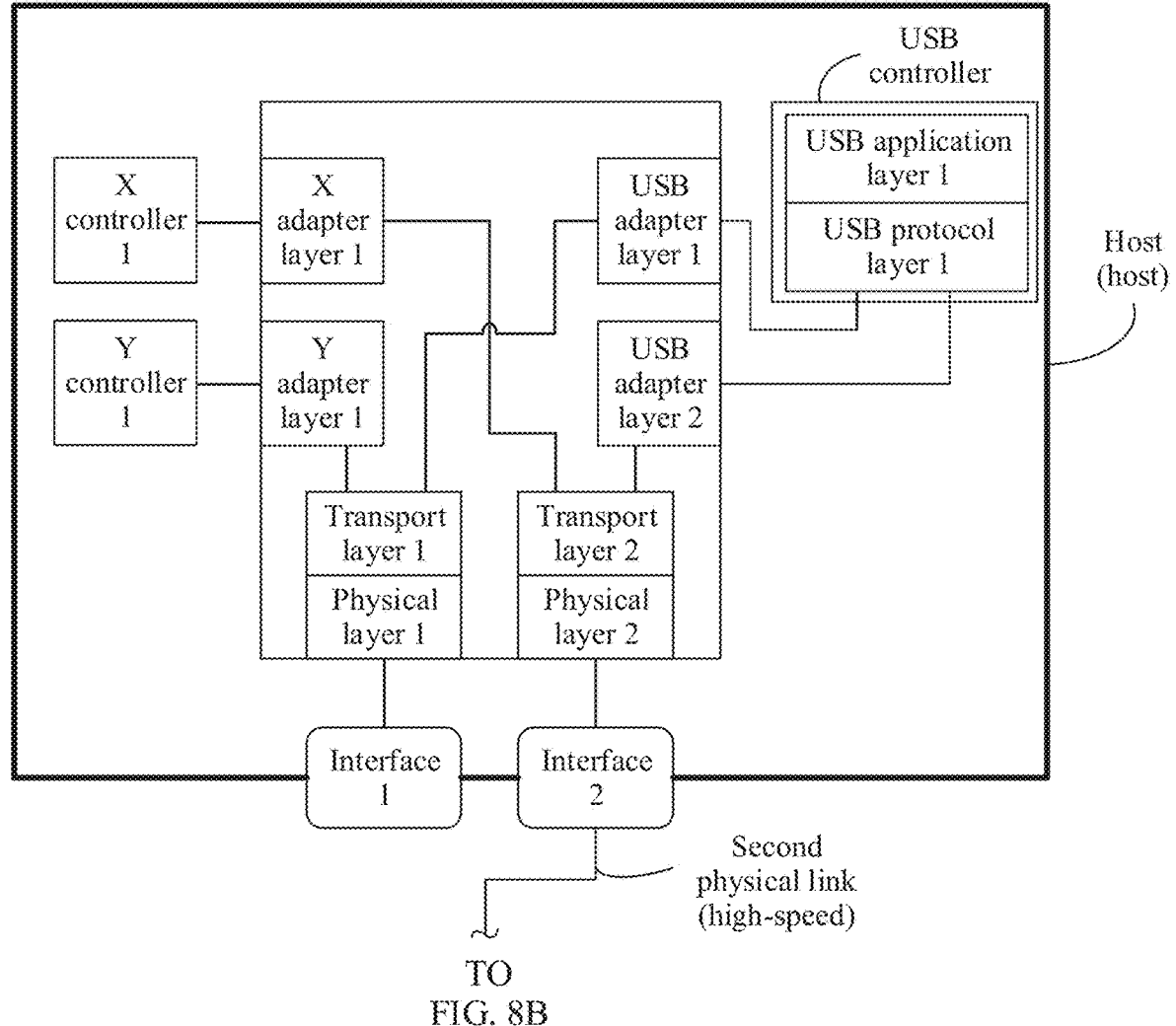
FIG. 8A to FIG. 8C are a schematic diagram of a scenario in which a plurality of communication apparatuses perform communication according to an embodiment of this application.
Figure 8B:
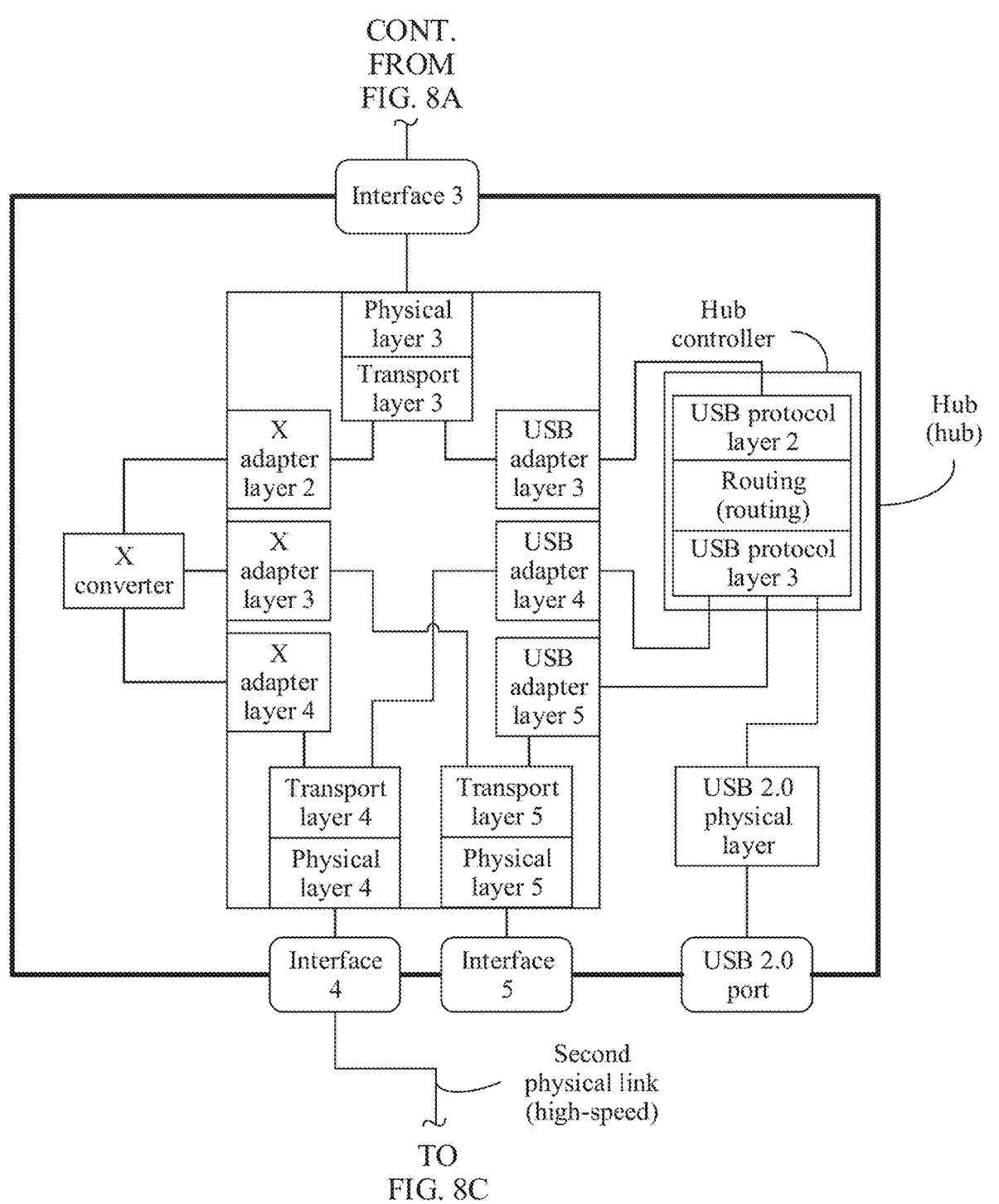
Figure 8C:
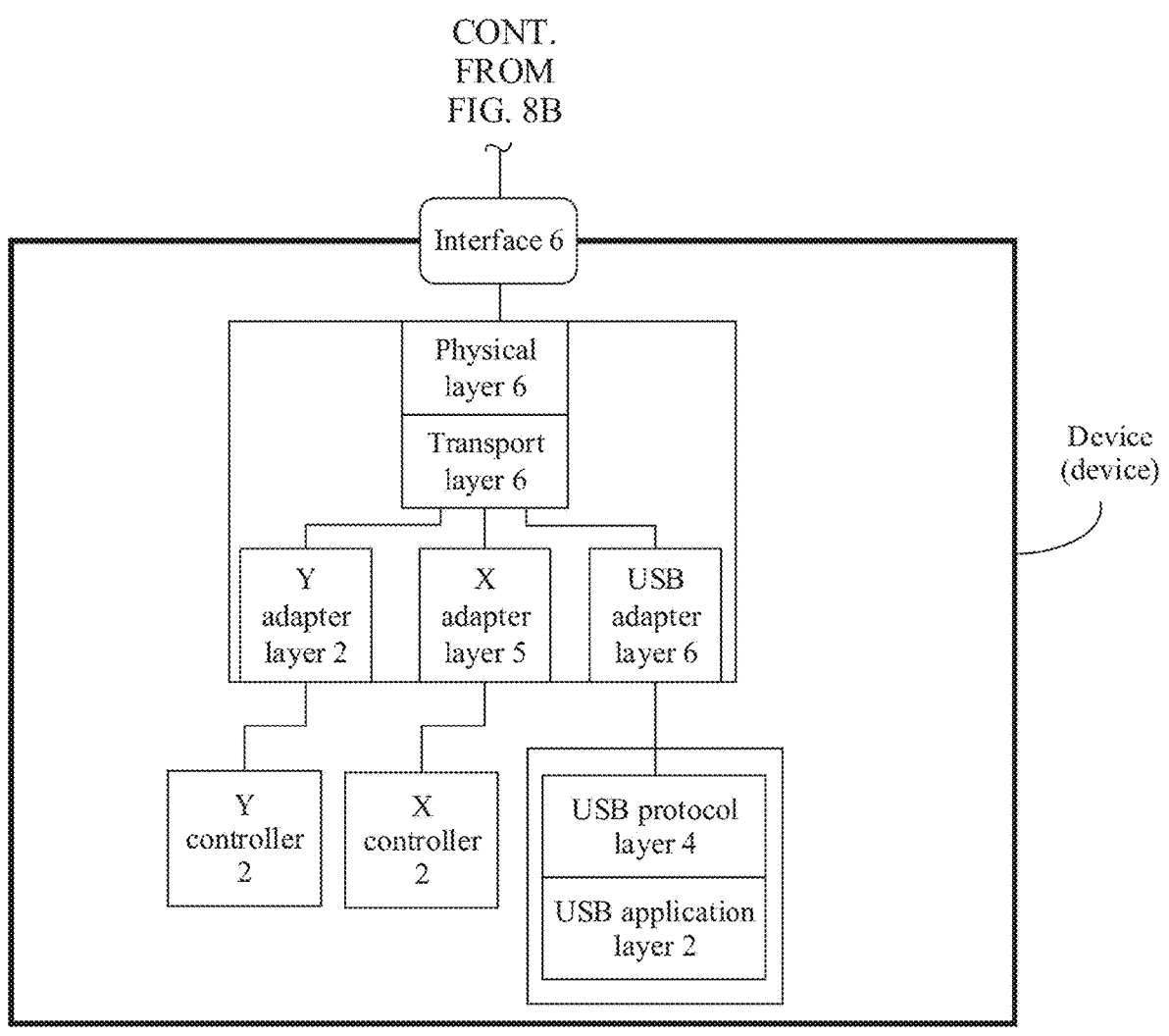

FIG. 8A to FIG. 8C are a schematic diagram of a scenario in which a plurality of communication apparatuses 310 are used for communication according to an embodiment of this application. FIG. 8A to FIG. 8C are a schematic diagram of a scenario in which a host (Host) establishes a connection to a device (Device) through a hub (Hub), to perform data transmission. It should be understood that the host (Host) may include a plurality of interfaces (only two interfaces are shown in FIG. 8A to FIG. 8C). When a quantity of host (Host) interfaces is limited, a manner shown in FIG. 8A to FIG. 8C may be used, to be specific, the host (Host) extends a connection capability by connecting to the hub (Hub), so that the host can be connected to a plurality of devices (Devices), to perform data transmission with the plurality of devices (Devices) at the same time. When the host (Host) does not need to perform data transmission with the plurality of devices at the same time, the host (Host) may be directly connected to the device (Device) to perform data transmission. This is not specifically limited in this application.

The following describes in detail specific transmission paths used when data of different protocols is transmitted in the scenario shown in FIG. 8A to FIG. 8C. FIG. 8A to FIG. 8C include three communication apparatuses: the host (Host), the hub (Hub), and the device (Device). The host (Host) may communicate with the hub (Hub) through a second physical link, and the hub (Hub) may communicate with the device (Device) through a second physical link. X and Y in FIG. 8A to FIG. 8C represent any other protocols that can be aggregated with the USB 2.0. For example, the X protocol and the Y protocol may be the USB 3.0 protocol and the PCIe protocol, respectively. This is not specifically limited in this application.

The host (Host) shown in FIG. 8A to FIG. 8C includes data transmission paths of three protocols: the USB 2.0 protocol, the X protocol, and the Y protocol. For the USB 2.0 protocol, USB 2.0 data is transmitted to a USB protocol layer 1 through a USB application layer 1. Then, the USB 2.0 data is transmitted to a USB adapter layer 1 or a USB adapter layer 2 through the USB protocol layer 1. USB 2.0 data on which the USB adapter layer 1 performs physical link adaptation is sent through a transport layer 1, a physical layer 1, an interface 1, and the second physical link (not shown in the figure). USB 2.0 data on which the USB adapter layer 2 performs physical link adaptation is sent to the hub (Hub) through a transport layer 2, a physical layer 2, an interface 2, and the second physical link. For the X protocol, X protocol data is sent to the hub (Hub) through an X controller 1, an X adapter layer 1, the transport layer 2, the physical layer 2, the interface 2, and the second physical link. For the Y protocol, Y protocol data is transmitted through a Y controller 1, a Y adapter layer 1, the transport layer 1, the physical layer 1, and the interface 1. It can be learned that both a data transmission path of the X protocol and a data transmission path of the USB 2.0 protocol include the transport layer 2 and the physical layer 2, and both a data transmission path of the Y protocol and the data transmission path of the USB 2.0 protocol include the transport layer 1 and the physical layer 1. It should be understood that two USB 2.0 data paths in the host (Host) may be equivalent to USB 2.0 data paths included in the communication apparatus 310 or the target apparatus 320 in FIG. 3A or FIG. 3B.

The hub (Hub) shown in FIG. 8A to FIG. 8C includes data transmission paths of two protocols: a data transmission path of the USB 2.0 protocol and a data transmission path of the X protocol. For the USB 2.0 protocol, the USB 2.0 data is transmitted to routing (Routing) through an interface 3, a physical layer 3, a transport layer 3, a USB adapter layer 3, and a USB protocol layer 2 for processing. Then, processed USB 2.0 data is transmitted to a USB adapter layer 4 or a USB adapter layer 5 through a USB protocol layer 3. Data on which the USB adapter layer 4 performs physical link adaptation is sent to the device (Device) through a transport layer 4, a physical layer 4, an interface 4, and the second physical link. Data on which the USB adapter layer 5 performs physical link adaptation is sent to the device (Device) through a transport layer 5, a physical layer 5, an interface 5, and the second physical link (not shown). In a feasible implementation, the data transmission path of the USB 2.0 protocol may further retain a USB 2.0 physical layer and a USB 2.0 interface (pin), to be compatible with an existing USB 2.0 device. For the X protocol, the X protocol data is transmitted to an X converter through the transport layer 3, the physical layer 3, and an X adapter layer 2. The X converter extends the data transmission path of the X protocol into two paths. The X protocol data passing through the X converter may be sent to an X adapter layer 3 or an X adapter layer 4. X protocol data obtained after the X adapter layer 3 performs physical link adaptation is sent to the device (Device) through the transport layer 5, the physical layer 5, the interface 5, and the second physical link (not shown). X protocol data obtained after the X adapter layer 4 performs physical link adaptation is sent to the device (Device) through the transport layer 4, the physical layer 4, the interface 4, and the second physical link. The hub (Hub) may further include a link of the Y protocol, and a specific structure of the link may be defined based on a specific application scenario. This is not specifically limited in this application.

The device (Device) shown in FIG. 8A to FIG. 8C includes data transmission paths of three protocols: the USB 2.0 protocol, the X protocol, and the Y protocol. For the USB 2.0 protocol, the USB 2.0 data is transmitted to a USB adapter layer 6 through an interface 6, a physical layer 6, and a transport layer 6, and the USB 2.0 data is re-assembled to USB 2.0 data through the USB adapter layer 6, and the USB 2.0 data is sent to a USB protocol layer 4 and a USB application layer 2. For the X protocol, the X protocol data is transmitted to an X adapter layer 5 through the interface 6, the physical layer 6, and the transport layer 6, and is re-assembled to X protocol data through the X adapter layer 5, and the X protocol data is sent to an X controller 2. A data transmission process of the Y protocol is correspondingly the same as that of the X protocol, and details are not described herein again.

Optionally, the data transmission paths of the USB 2.0 protocol in the host (Host) and the device (Device) may also retain the USB 2.0 physical layer and the USB 2.0 pin, to perform data transmission with the existing USB 2.0 device.

It should be understood that the foregoing embodiment describes only a process of transmitting the protocol data from the host (Host) to the device (Device). A process in which the protocol data is transmitted from the device (Device) to the host (Host) is similar to the process described above, and details are not described herein again. In addition, data transmission may be performed between the host (Host), the hub (Hub), and the device (Device) in a wired or wireless form. When the host (Host), the hub (Hub), and the device (Device) perform data transmission through a wireless channel, the foregoing three communication apparatuses may not include the interfaces shown in FIG. 8A to FIG. 8C.

FIG. 9 is a schematic flowchart of a data transmission method 900 according to an embodiment of this application. The data transmission method is applicable to the communication apparatus or target apparatus in any one of FIG. 3A, FIG. 3B, FIG. 6, FIG. 7, and FIG. 8A to FIG. 8C, and a device that includes the communication apparatus or target apparatus. The method 900 may include step S901 to step S903: In step S901, a universal serial bus USB protocol layer sends first data to a USB adapter layer; in step S902, the USB adapter layer performs physical link adaptation on the first data to obtain second data, and sends the second data to a transport layer, where the first data is adapted to a first physical link, the second data is adapted to a second physical link, and a bandwidth of the first physical link is lower than a bandwidth of the second physical link; and in step S903, the transport layer and a physical layer process the second data, and send processed second data to a receive end through the second physical link.

In a feasible implementation, when the first data includes any one of a token packet, a handshake packet, or a special packet, that the USB adapter layer performs physical link adaptation on the first data to obtain second data includes: The USB adapter layer encapsulates the first data to obtain a first transmission packet, where the second data includes the first transmission packet.

In a feasible implementation, when the first data includes a data packet, that the USB adapter layer performs physical link adaptation on the first data to obtain second data includes: The USB adapter layer splits the data packet into a plurality of first data payloads, and separately encapsulates the plurality of first data payloads to obtain a plurality of second transmission packets, where the second data includes the plurality of second transmission packets.

In a feasible implementation, when the first data further includes a bus event, that the USB adapter layer performs physical link adaptation on the first data to obtain second data includes: When the bus event arrives, the USB adapter layer encapsulates a start part of the bus event to obtain a third transmission packet. The transport layer and the physical layer process the third transmission packet and send a processed third transmission packet to the receive end through the second physical link. When the bus event ends, the USB adapter layer encapsulates an end part of the bus event to obtain a fourth transmission packet. The transport layer and the physical layer process the fourth transmission packet and send a processed fourth transmission packet to the receive end through the second physical link.

In a feasible implementation, the method includes: The USB protocol layer sends control information to the USB adapter. The USB adapter layer obtains first virtual resistor information from the control information through parsing, and encapsulates the first virtual resistor information to obtain a fifth transmission packet. The transport layer and the physical layer process the fifth transmission packet, and send a processed fifth transmission packet to the receive end through the second physical link. The first virtual resistor information is used to represent a status of a virtual bus by describing an on state or off state of a virtual resistor in the communication apparatus. The virtual bus is a bus that matches the USB protocol layer, and the virtual resistor in the communication apparatus corresponds to a physical resistor. The physical resistor includes at least one of a high-speed termination resistor, a pull-up resistor, or a pull-down resistor.

In a feasible implementation, the first transmission packet, the second transmission packet, the third transmission packet, the fourth transmission packet, and the fifth transmission packet each include a header and a data payload, and the header includes corresponding transmission packet type information, data payload length information, and reliability protection information.

In a feasible implementation, the method further includes: The physical layer and the transport layer process third data received through the second physical link, and send processed third data to the USB adapter layer. The USB adapter layer performs physical link adaptation on the processed third data to obtain fourth data, and sends the fourth data to the USB protocol layer. The third data is adapted to the second physical link and the fourth data is adapted to the first physical link.

In a feasible implementation, when the processed third data includes one or more transmission packets, that the USB adapter layer performs physical link adaptation on the processed third data to obtain fourth data includes: The USB adapter layer separately parses a header or headers of the one or more transmission packets to obtain type information of the one or more transmission packets; and when the one or more transmission packets are data packets, the USB adapter layer aggregates one or more data payloads corresponding to the one or more transmission packets to obtain the fourth data; or when the one or more transmission packets are not data packets, the USB adapter layer uses each of one or more data payloads corresponding to the one or more transmission packets as the fourth data.

In a feasible implementation, the method further includes: The physical layer and the transport layer process a sixth transmission packet received through the second physical link, and send a processed sixth transmission packet to the USB adapter layer. The USB adapter layer receives the processed sixth transmission packet, and parses the processed sixth transmission packet to obtain second virtual resistor information. The second virtual resistor information includes an on state or off state of a virtual resistor at the receive end. The second virtual resistor information is used to represent a status of a virtual bus, and the virtual resistor at the receive end corresponds to a physical resistor. The physical resistor includes at least one of a high-speed termination resistor, a pull-up resistor, or a pull-down resistor.

In a feasible implementation, the method further includes: When the USB adapter layer receives the first data, the USB adapter layer determines the status of the virtual bus based on content of the first data. When the USB adapter layer sends the fourth data, the USB adapter layer determines the status of the virtual bus based on content of the fourth data. When the USB adapter layer neither receives the first data and nor sends the fourth data, the USB adapter layer determines the status of the virtual bus based on the first virtual resistor information and the second virtual resistor information. The USB adapter layer sends the current status of the virtual bus to the USB protocol layer.

In a feasible implementation, the method further includes: The USB protocol layer determines a working status of the communication apparatus at a next moment based on the status of the virtual bus. The working status includes at least one of the following: whether the USB protocol layer sends the first data or whether the USB protocol layer receives sixth data, the content included in the first data when the USB protocol layer sends the first data, or the first virtual resistor information obtained, by the USB adapter layer by parsing the control information, when the USB protocol layer sends the control information.

Figure 10:
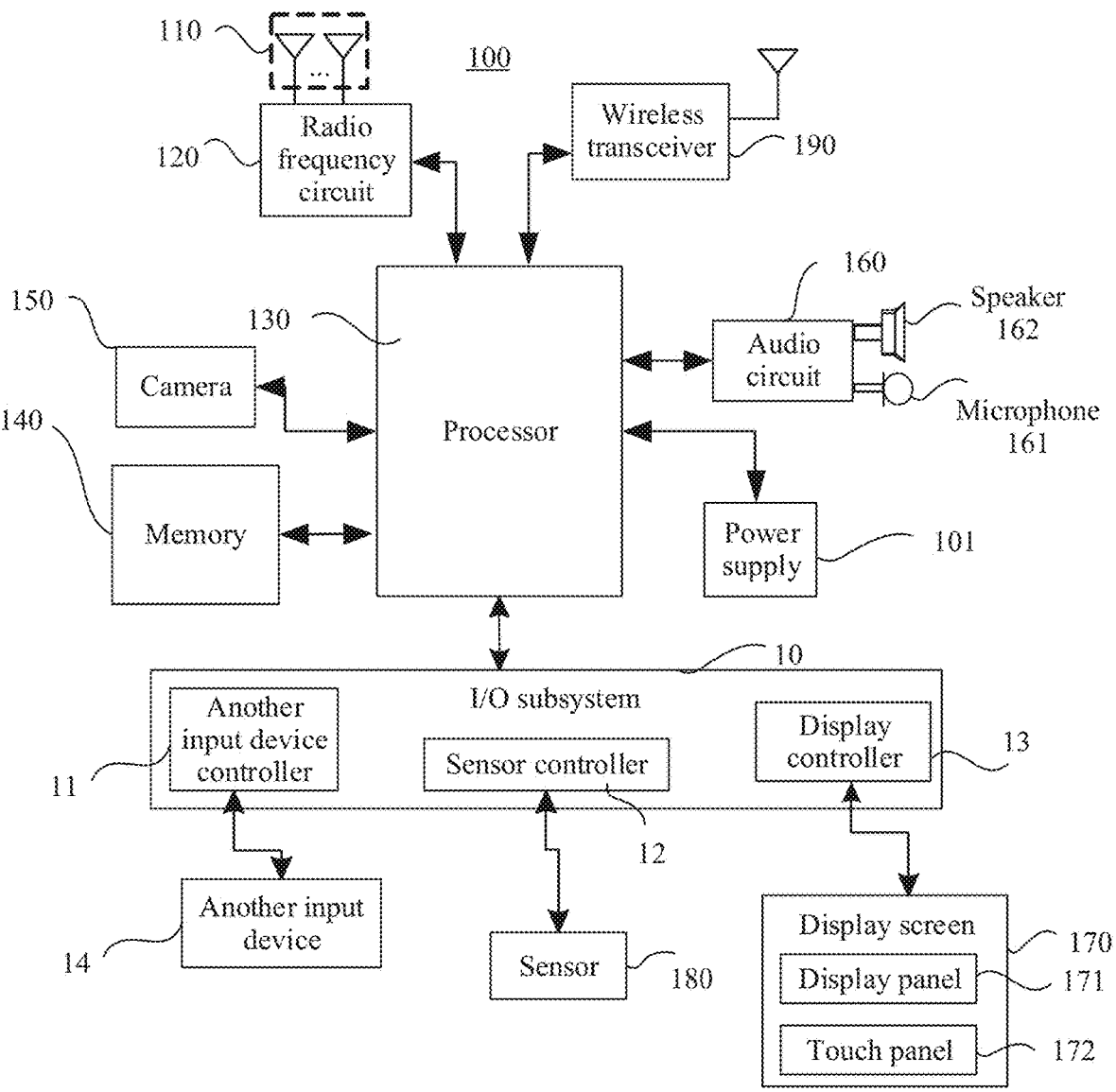
FIG. 10 is a schematic diagram of an architecture of an example of a terminal according to an embodiment of this application.

FIG. 10 is a schematic diagram of an architecture of an example of a terminal 100 according to an embodiment of this application. It should be understood that the terminal 100 may be the foregoing communication apparatus 310 or the target apparatus 320. The terminal 100 may include an antenna system 110, a radio frequency (Radio Frequency, RF) circuit 120, a processor 130, a memory 140, a camera 150, an audio circuit 160, a display screen 170, one or more sensors 180, a wireless transceiver 190, and the like.

The antenna system 110 may be one or more antennas, or may be an antenna array including a plurality of antennas. The radio frequency circuit 120 may include one or more analog radio frequency transceivers, and the radio frequency circuit 120 may further include one or more digital radio frequency transceivers. The RF circuit 120 is coupled to the antenna system 110. It should be understood that, in embodiments of this application, coupling refers to a mutual connection in a specific manner, including a direct connection or an indirect connection through another device. For example, a connection may be made through various interfaces, transmission lines, buses, or the like. The radio frequency circuit 120 may be used for various types of cellular wireless communication.

The processor 130 may include a communication processor. The communication processor may be configured to control the RF circuit 120 to receive and send signals through the antenna system 110. The signal may be a voice signal, a media signal, or a control signal. The processor 130 may include various general-purpose processing devices, for example, a general-purpose central processing unit (Central Processing Unit, CPU), a system on chip (System on Chip, SOC), a processor integrated in the SOC, and an independent processor chip or a controller. The processor 130 may further include dedicated processing devices, for example, an application-specific integrated circuit (Application-Specific Integrated Circuit, ASIC), a field programmable gate array (Field Programmable Gate Array, FPGA) or a digital signal processor (Digital Signal Processor, DSP), a dedicated video or graphics processing unit, a graphics processing unit (Graphics Processing Unit, GPU), and a neural-network processing unit (Neural-network Processing Unit, NPU). The processor 130 may be a processor group including a plurality of processors, and the plurality of processors are coupled to each other through one or more buses. The processor may include an analog-to-digital converter (Analog-to-Digital Converter, ADC) and a digital-to-analog converter (Digital-to-Analog Converter, DAC) to implement a signal connection between different components of the apparatus.

The memory 140 is coupled to the processor 130. Specifically, the memory 140 may be coupled to the processor 130 through one or more memory controllers. The memory 140 may be configured to store computer program instructions, including a computer operating system (Operating System, OS), various user applications, user data, and the like. The processor 130 may read the computer program instructions or the user data from the memory 140, or store the computer program instructions or the user data into the memory 140, to implement a related processing function. The memory 140 may be a non-power-down volatile memory, for example, an eMMC (Embedded Multimedia Card, embedded multimedia card), a UFS (Universal Flash Storage, universal flash storage) or a read-only memory (Read-Only Memory, ROM), or another type of static storage device that can store static information and instructions, or may be a power-down volatile memory (volatile memory), for example, a random access memory (Random Access Memory, RAM), a static random access memory (Static random access memory, SRAM) or another type of dynamic storage device that can store information and instructions, or may be an electrically erasable programmable read-only memory (Electrically Erasable Programmable Read-Only Memory, EEPROM), a compact disc read-only memory (Compact Disc Read-Only Memory, CD-ROM) or another compact disc memory, an optical disc memory (including a compact disc, a laser disc, a digital versatile disc, a Blu-ray disc, or the like), a magnetic disk storage medium, or another magnetic storage device, but not limited thereto. Optionally, the memory 140 may be independent of the processor 130, or the memory 140 may be integrated with the processor 130.

The camera 150 is configured to capture an image or a video, and the audio circuit 160 is coupled to the processor 130. The audio circuit 160 may include a microphone 161 and a speaker 162. The microphone 161 may receive a sound input from the outside, and the speaker 162 may play audio data.

The display screen 170 is configured to provide a user with various display interfaces or various menu information that can be selected. For example, content displayed on the display screen 170 includes but is not limited to a soft keyboard, a virtual mouse, a virtual key, an icon, and the like. The display content is associated with a specific internal module or function. The display screen 170 may further accept a user input. Specifically, the display screen 170 may include a display panel 171 and a touch panel 172.

The sensor 180 may include an image sensor, a motion sensor, a proximity sensor, an ambient noise sensor, a sound sensor, an accelerometer, a temperature sensor, a gyroscope, or other type of sensors, and combinations of various forms thereof. The processor 130 drives, through a sensor controller 12 in an I/O subsystem 10, the sensor 180 to receive various information such as audio information, image information, or motion information, and the sensor 180 transmits the received information to the processor 130 for processing.

The wireless transceiver 190 may provide a wireless connection capability for another device. The another device may be a peripheral device such as a wireless headset, a Bluetooth headset, a wireless mouse, or a wireless keyboard, or may be a wireless network, for example, a wireless fidelity (Wireless Fidelity, Wi-Fi) network, a wireless personal area network (Wireless Personal Area Network, WPAN), or a WLAN. The wireless transceiver 190 may be a Bluetooth-compatible transceiver, configured to wirelessly couple the processor 130 to the peripheral device such as the Bluetooth headset or the wireless mouse. Alternatively, the wireless transceiver 190 may be a Wi-Fi-compatible transceiver, configured to wirelessly couple the processor 130 to the wireless network or the another device.

The terminal 100 may further include another input device 14, which is coupled to the processor 130 to receive various user inputs, for example, receive an input number, name, address, and media selection. The another input device 14 may include a keyboard, a physical button (press button, rocker button, or the like), a dial plate, a slide switch, or the like. The terminal 100 may further include the foregoing I/O subsystem 10 and a power supply 101. It should be understood that the terminal 100 in FIG. 10 is merely an example, and constitutes no limitation on a specific form of the terminal 100. The terminal 100 may further include other existing or future components that may be added and that are not shown in FIG. 10.

Figure 11:
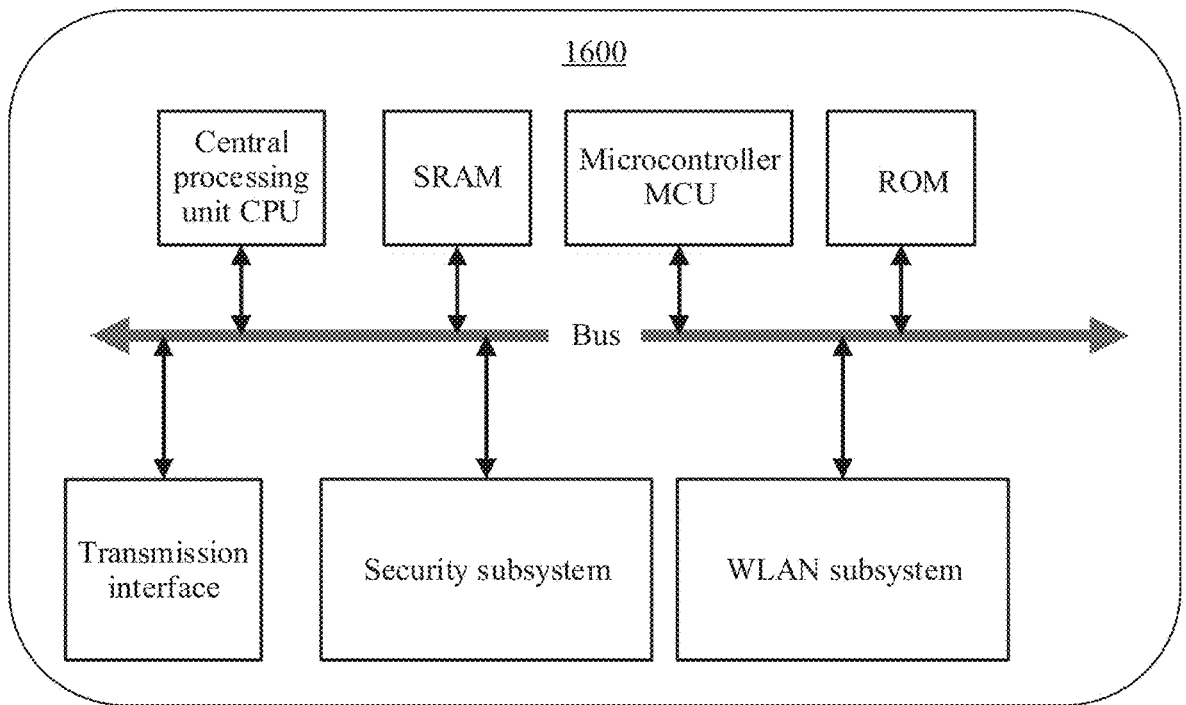
FIG. 11 is an architectural diagram of a processor according to an embodiment of this application.

FIG. 11 is an architectural diagram of a processor 1600 according to an embodiment of this application. The processor 1600 may be the processor in FIG. 10.

As shown in FIG. 11, the processor 1600 includes at least one CPU and a memory. A type of the memory may include, for example, a static random access memory (Static Random Access Memory, SRAM), a read-only memory (Read-Only Memory, ROM), a microcontroller (Microcontroller Unit, MCU), a security subsystem, a wireless local area network (Wireless Local Area Network, WLAN) subsystem, a bus, and a transmission interface. Although not shown in FIG. 11, the apparatus 700 may further include another dedicated processor such as an application processor (Application Processor, AP) or an NPU, and other subsystems such as a power management subsystem, a clock management subsystem, and a power consumption management subsystem.

The foregoing parts of the apparatus 1600 are coupled through a connector. For example, the connector includes various interfaces, transmission lines, or buses. These interfaces are usually electrical communication interfaces, but may alternatively be mechanical interfaces or interfaces in other forms. This is not limited in this embodiment.

Optionally, the CPU may be a single-core (single-CPU) processor or a multi-core (multi-CPU) processor. Optionally, the CPU may be a processor group including a plurality of processors, and the plurality of processors are coupled to each other through one or more buses. In an optional case, the CPU invokes program instructions stored in an on-chip memory or off-chip memory to implement any wireless screen projection method in the foregoing method embodiments. In an optional case, the CPU and the MCU jointly implement any wireless screen projection method in the foregoing method embodiments. For example, the CPU completes some steps in the wireless screen projection method, and the MCU completes other steps in the wireless screen projection method. In an optional case, the AP or another dedicated processor implements any wireless screen projection method in the foregoing method embodiments by invoking the program instructions stored in the on-chip memory or off-chip memory.

The transmission interface may be an interface of the processor chip for receiving and sending data. The transmission interface usually includes a plurality of interfaces. In an optional case, the transmission interface may include an inter-integrated circuit (Inter-Integrated Circuit, I2C) interface, a serial peripheral interface (Serial Peripheral Interface, SPI), a universal asynchronous receiver-transmitter (Universal asynchronous receiver-transmitter, UART) interface, a general-purpose input/output (General-purpose input/output, GPIO) interface, and the like. It should be understood that these interfaces may implement different functions by multiplexing a same physical interface.

In an optional case, the transmission interface may further include a high-definition multimedia interface (High-Definition Multimedia Interface, HDMI), a V-By-One interface, an embedded display port (Embedded Display Port, eDP), a mobile industry processor interface (Mobile Industry Processor Interface, MIPI), a display port (DP), or the like.

In an optional case, the foregoing parts are integrated on a same chip. In another optional case, the memory may be an independent chip.

The security subsystem may be configured to implement an encryption algorithm related to security authentication. It should be understood that the encryption algorithm related to security authentication is usually implemented by hardware, so that security of the encryption algorithm can be further improved.

The WLAN subsystem may include, for example, an RF circuit and a baseband.

The chip in this embodiment of this application is a system manufactured on a same semiconductor substrate by using an integrated circuit process, and is also referred to as a semiconductor chip. The chip may be a set of integrated circuits formed on a substrate (usually a semiconductor material such as silicon) manufactured by using the integrated circuit process. An outer layer of the chip is typically encapsulated by a semiconductor packaging material. The integrated circuit may include various types of functional devices. Each type of functional device includes a transistor such as a logic gate circuit, a metal-oxide-semiconductor (Metal-Oxide-Semiconductor, MOS) transistor, a bipolar transistor, or a diode, and may further include another component such as a capacitor, a resistor, or an inductor. Each functional device may independently operate or operate under action of necessary driver software, and may implement various functions such as communication, operation, or storage.

What is claimed is:

1. A communication apparatus, comprising: a universal serial bus (USB) protocol layer, a USB adapter layer, a transport layer, and a physical layer, wherein
   the USB protocol layer is configured to send first data to the USB adapter layer;
   the USB adapter layer is configured to perform physical link adaptation on the first data to obtain second data, and send the second data to the transport layer, wherein the first data is adapted to a first physical link, the second data is adapted to a second physical link, and a bandwidth of the first physical link is lower than a bandwidth of the second physical link; and the transport layer and the physical layer are configured to process the second data and send processed second data to a receive end through the second physical link, and wherein the USB protocol layer is configured to send control information to the USB adapter layer:

the USB adapter layer is further configured to:

obtain first virtual resistor information from the control information through parsing; and encapsulate the first virtual resistor information to obtain a fifth transmission packet, wherein the first virtual resistor information represents a status of a virtual bus by describing an on state or off state of a virtual resistor in the communication apparatus, the virtual bus is a bus that matches the USB protocol layer, the virtual resistor in the communication apparatus corresponds to a physical resistor, and the physical resistor comprises at least one of a high-speed termination resistor, a pull-up resistor, or a pull-down resistor.

2. The communication apparatus according to claim 1, wherein in response to that the first data comprises at least one of a token packet, a handshake packet, or a special packet, the USB adapter layer is specifically configured to:

encapsulate the first data to obtain a first transmission packet, wherein the second data comprises the first transmission packet.

3. The communication apparatus according to claim 1, wherein in response to that the first data comprises a data packet, the USB adapter layer is specifically configured to:

split the data packet into a plurality of first data payloads and separately encapsulate the plurality of first data payloads to obtain a plurality of second transmission packets, wherein the second data comprises the plurality of second transmission packets.

4. The communication apparatus according to claim 1, wherein in response to that the first data further comprises a bus event, the USB adapter layer is specifically configured to:

in response to determining that the bus event arrives, encapsulate a start part of the bus event to obtain a third transmission packet;

the transport layer and the physical layer are specifically configured to process the third transmission packet and send a processed third transmission packet to the receive end through the second physical link;

the USB adapter layer is further specifically configured to:

in response to determining that the bus event ends, encapsulate an end part of the bus event to obtain a fourth transmission packet; and the transport layer and the physical layer are specifically configured to process the fourth transmission packet and send a processed fourth transmission packet to the receive end through the second physical link.

5. The communication apparatus according to claim 1, wherein the transport layer and the physical layer are specifically configured to process the fifth transmission packet and send a processed fifth transmission packet to the receive end through the second physical link.

6. The communication apparatus according to claim 2, wherein the first transmission packet comprises a header and a data payload, and the header comprises corresponding transmission packet type information, data payload length information, and reliability protection information.

7. The communication apparatus according to claim 1, wherein the physical layer and the transport layer are further configured to process third data received through the second physical link and send processed third data to the USB adapter layer; and the USB adapter layer is further configured to perform physical link adaptation on the processed third data to obtain fourth data and send the fourth data to the USB protocol layer, wherein the third data is adapted to the second physical link, and the fourth data is adapted to the first physical link.

8. The communication apparatus according to claim 7, wherein when the processed third data comprises one or more transmission packets, the USB adapter layer is specifically configured to:

separately parse a header or headers of the one or more transmission packets to obtain type information of the one or more transmission packets; and in response to determining that the one or more transmission packets are data packets, aggregate one or more data payloads corresponding to the one or more transmission packets to obtain the fourth data; or in response to determining that the one or more transmission packets are not data packets, use each of the one or more data payloads corresponding to the one or more transmission packets as the fourth data.

9. The communication apparatus according to claim 7, wherein the physical layer and the transport layer are further configured to process a sixth transmission packet received through the second physical link and send a processed sixth transmission packet to the USB adapter layer; and the USB adapter layer is further configured to receive the processed sixth transmission packet and parse the processed sixth transmission packet to obtain second virtual resistor information, wherein the second virtual resistor information comprises an on state or off state of a virtual resistor at the receive end, the second virtual resistor information represents a status of a virtual bus, the virtual resistor at the receive end corresponds to a physical resistor, and the physical resistor comprises at least one of a high-speed termination resistor, a pull-up resistor, or a pull-down resistor.

10. The communication apparatus according to claim 9, wherein the USB adapter layer is further configured to:

in response to determining that the USB adapter layer receives the first data, determine a status of a virtual bus based on content of the first data;

in response to determining that the USB adapter layer sends the fourth data, determine the status of the virtual bus based on content of the fourth data; or in response to determining that the USB adapter layer neither receives the first data and nor sends the fourth data, determine the status of the virtual bus based on first virtual resistor information and the second virtual resistor information; and send a current status of the virtual bus to the USB protocol layer.

11. The communication apparatus according to claim 10, wherein the USB protocol layer is further configured to:

determine a working status of the communication apparatus at a next moment based on the status of the virtual bus, wherein the working status comprises at least one of the following: whether the USB protocol layer sends the first data or whether the USB protocol layer receives sixth data, the content comprised in the first data when the USB protocol layer sends the first data, or the first virtual resistor information obtained, by the USB adapter layer by parsing control information, when the USB protocol layer sends the control information.

12. A data transmission method, comprising:

sending, by a universal serial bus (USB) protocol layer, first data to a USB adapter layer;

performing, by the USB adapter layer, physical link adaptation on the first data to obtain second data, and sending the second data to a transport layer, wherein the first data is adapted to a first physical link, the second data is adapted to a second physical link, and a bandwidth of the first physical link is lower than a bandwidth of the second physical link; and processing, by the transport layer and a physical layer, the second data and sending processed second data to a receive end through the second physical link, and wherein the method comprises:

receiving, by the USB adapter layer from the USB protocol layer, control information;

obtain, by the USB adapter layer, first virtual resistor information from the control information through parsing; and encapsulate, by the USB adapter layer, the first virtual resistor information to obtain a fifth transmission packet, wherein the first virtual resistor information represents a status of a virtual bus by describing an on state or off state of a virtual resistor, the virtual bus is a bus that matches the USB protocol layer, the virtual resistor corresponds to a physical resistor, and the physical resistor comprises at least one of a high-speed termination resistor, a pull-up resistor, or a pull-down resistor.

13. The data transmission method according to claim 12, wherein in response to that the first data comprises at least one of a token packet, a handshake packet, or a special packet, the performing, by the USB adapter layer, physical link adaptation on the first data to obtain second data comprises: encapsulating, by the USB adapter layer, the first data to obtain a first transmission packet, wherein the second data comprises the first transmission packet.

14. The data transmission method according to claim 12, wherein in response to that the first data comprises a data packet, the performing, by the USB adapter layer, physical link adaptation on the first data to obtain second data comprises: splitting, by the USB adapter layer, the data packet into a plurality of first data payloads and separately encapsulating the plurality of first data payloads to obtain a plurality of second transmission packets, wherein the second data comprises the plurality of second transmission packets.

15. The data transmission method according to claim 12, wherein in response to that the first data further comprises a bus event, the performing, by the USB adapter layer, physical link adaptation on the first data to obtain second data comprises:

in response to determining that the bus event arrives, encapsulating, by the USB adapter layer, a start part of the bus event to obtain a third transmission packet;

the processing, by the transport layer and a physical layer, the second data, and sending processed second data to a receive end through the second physical link comprises:

processing, by the transport layer and the physical layer, the third transmission packet and sending a processed third transmission packet to the receive end through the second physical link;

in response to determining that the first data further comprises the bus event, the performing, by the USB adapter layer, physical link adaptation on the first data to obtain second data further comprises:

in response to determining that the bus event ends, encapsulating, by the USB adapter layer, an end part of the bus event to obtain a fourth transmission packet; and the processing, by the transport layer and a physical layer, the second data and sending processed second data to a receive end through the second physical link further comprises:

processing, by the transport layer and the physical layer, the fourth transmission packet and sending a processed fourth transmission packet to the receive end through the second physical link.

16. The data transmission method according to claim 13, wherein the first transmission packet comprises a header and a data payload, and the header comprises corresponding transmission packet type information, data payload length information, and reliability protection information.

17. The data transmission method according to claim 12, further comprising:

processing third data received through the second physical link and sending processed third data to the USB adapter layer; and performing physical link adaptation on the processed third data to obtain fourth data and sending the fourth data to the USB protocol layer, wherein the third data is adapted to the second physical link, and the fourth data is adapted to the first physical link.

18. A non-transitory computer storage medium, coupled to at least one processor of a communication apparatus and storing programming instructions for execution by the at least one processor to cause the communication apparatus to perform operations comprising:

sending, by a universal serial bus (USB) protocol layer of the communication apparatus, first data to a USB adapter layer of the communication apparatus;

performing, by the USB adapter layer, physical link adaptation on the first data to obtain second data, and sending the second data to a transport layer of the communication apparatus, wherein the first data is adapted to a first physical link, the second data is adapted to a second physical link, and a bandwidth of the first physical link is lower than a bandwidth of the second physical link; and processing, by the transport layer and a physical layer of the communication apparatus, the second data and sending processed second data to a receive end through the second physical link, and wherein the operations comprise:

receiving, by the USB adapter layer from the USB protocol layer, control information;

obtain, by the USB adapter layer, first virtual resistor information from the control information through parsing; and encapsulate, by the USB adapter layer, the first virtual resistor information to obtain a fifth transmission packet, wherein the first virtual resistor information represents a status of a virtual bus by describing an on state or off state of a virtual resistor in the communication apparatus, the virtual bus is a bus that matches the USB protocol layer, the virtual resistor in the communication apparatus corresponds to a physical resistor, and the physical resistor comprises at least one of a high-speed termination resistor, a pull-up resistor, or a pull-down resistor.

19. The non-transitory computer storage medium according to claim 18, wherein in response to that the first data comprises at least one of a token packet, a handshake packet, or a special packet, the performing, by the USB adapter layer, physical link adaptation on the first data to obtain second data comprises:

encapsulating, by the USB adapter layer, the first data to obtain a first transmission packet, wherein the second data comprises the first transmission packet.

20. The non-transitory computer storage medium according to claim 18, wherein in response to that the first data comprises a data packet, the performing, by the USB adapter layer, physical link adaptation on the first data to obtain second data comprises:

splitting, by the USB adapter layer, the data packet into a plurality of first data payloads and separately encapsulating the plurality of first data payloads to obtain a plurality of second transmission packets, wherein the second data comprises the plurality of second transmission packets.

* * * * *